United States Patent
Chang et al.

(10) Patent No.: US 11,468,110 B2
(45) Date of Patent: Oct. 11, 2022

(54) UTILIZING NATURAL LANGUAGE PROCESSING AND MULTIPLE OBJECT DETECTION MODELS TO AUTOMATICALLY SELECT OBJECTS IN IMAGES

(71) Applicant: Adobe Inc., San Jose, CA (US)

(72) Inventors: Walter Wei Tuh Chang, San Jose, CA (US); Khoi Pham, Hyattsville, MD (US); Scott Cohen, Sunnyvale, CA (US); Zhe Lin, Fremont, CA (US); Zhihong Ding, Fremont, CA (US)

(73) Assignee: Adobe Inc., San Jose, CA (US)

( * ) Notice: Subject to any disclaimer, the term of this patent is extended or adjusted under 35 U.S.C. 154(b) by 228 days.

(21) Appl. No.: 16/800,415

(22) Filed: Feb. 25, 2020

(65) Prior Publication Data

US 2021/0263962 A1    Aug. 26, 2021

(51) Int. Cl.
*G06F 16/532* (2019.01)
*G06F 16/583* (2019.01)
(Continued)

(52) U.S. Cl.
CPC .......... *G06F 16/532* (2019.01); *G06F 16/243* (2019.01); *G06F 16/288* (2019.01);
(Continued)

(58) Field of Classification Search
CPC .. G06F 16/532; G06F 16/243; G06F 16/5854; G06F 16/538
(Continued)

(56) References Cited

U.S. PATENT DOCUMENTS 6,389,168 B2    5/2002   Altunbasak et al.
6,469,706 B1   10/2002   Syeda-Nahmood
(Continued)

FOREIGN PATENT DOCUMENTS

CN    103366178 A    10/2013
CN    107563494 A     1/2018
(Continued)

OTHER PUBLICATIONS

Combined Search and Examination Report as received in United Kingdom Application GB2005714.7 dated Sep. 3, 2020.
(Continued)

*Primary Examiner* — Kimberly L Wilson
(74) *Attorney, Agent, or Firm* — Keller Preece PLLC

(57) ABSTRACT

The present disclosure relates to an object selection system that automatically detects and selects objects in a digital image based on natural language-based inputs. For instance, the object selection system can utilize natural language processing tools to detect objects and their corresponding relationships within natural language object selection queries. For example, the object selection system can determine alternative object terms for unrecognized objects in a natural language object selection query. As another example, the object selection system can determine multiple types of relationships between objects in a natural language object selection query and utilize different object relationship models to select the requested query object.

20 Claims, 19 Drawing Sheets

(51) Int. Cl.
| | |
|---|---|
| *G06F 16/538* | (2019.01) |
| *G06F 16/33* | (2019.01) |
| *G06T 11/60* | (2006.01) |
| *G06K 9/62* | (2022.01) |
| *G06F 40/279* | (2020.01) |
| *G06F 40/247* | (2020.01) |
| *G06N 20/00* | (2019.01) |
| *G06F 16/242* | (2019.01) |
| *G06F 16/28* | (2019.01) |
| *G06F 40/30* | (2020.01) |

(52) U.S. Cl.
CPC ........ *G06F 16/3344* (2019.01); *G06F 16/538* (2019.01); *G06F 16/5854* (2019.01); *G06F 40/247* (2020.01); *G06F 40/279* (2020.01); *G06F 40/30* (2020.01); *G06K 9/628* (2013.01); *G06N 20/00* (2019.01); *G06T 11/60* (2013.01)

(58) Field of Classification Search
USPC .......................................................... 707/722
See application file for complete search history.

(56) References Cited

U.S. PATENT DOCUMENTS

| | | | |
|---|---|---|---|
| 8,107,726 B2 | 1/2012 | Xu et al. | |
| 8,385,688 B2 | 2/2013 | Gong et al. | |
| 8,818,024 B2 | 8/2014 | Chen et al. | |
| 9,129,191 B2 | 9/2015 | Cohen et al. | |
| 9,171,230 B2 | 10/2015 | Jiang et al. | |
| 9,576,223 B2 | 2/2017 | Aupetit et al. | |
| 9,619,488 B2 | 4/2017 | Ambardekar et al. | |
| 9,720,934 B1 | 8/2017 | Dube et al. | |
| 9,746,981 B2 | 8/2017 | Zachut et al. | |
| 9,858,496 B2 | 1/2018 | Sun et al. | |
| 10,146,751 B1 | 12/2018 | Zhang | |
| 10,192,129 B2 | 1/2019 | Price et al. | |
| 10,216,766 B2 | 2/2019 | Lin et al. | |
| 10,496,880 B2 | 12/2019 | Ye | |
| 10,713,794 B1 | 7/2020 | He et al. | |
| 10,740,647 B2 | 8/2020 | Du et al. | |
| 10,893,283 B2 | 1/2021 | Chen et al. | |
| 11,182,408 B2* | 11/2021 | Wu ..................... | G06F 16/9024 |
| 2003/0179213 A1 | 9/2003 | Liu | |
| 2003/0198380 A1 | 10/2003 | Shin et al. | |
| 2003/0233224 A1 | 12/2003 | Marchisio et al. | |
| 2008/0069444 A1 | 3/2008 | Wilensky | |
| 2009/0281925 A1 | 11/2009 | Winter et al. | |
| 2010/0158412 A1 | 6/2010 | Wang et al. | |
| 2010/0166321 A1 | 7/2010 | Sawant et al. | |
| 2011/0026835 A1 | 2/2011 | Ptucha et al. | |
| 2011/0029553 A1 | 2/2011 | Bogart et al. | |
| 2011/0085739 A1 | 4/2011 | Zhang et al. | |
| 2011/0216973 A1 | 9/2011 | Mojsilovic | |
| 2013/0257886 A1 | 10/2013 | Kerofsky et al. | |
| 2014/0334722 A1 | 11/2014 | Bloore et al. | |
| 2015/0169142 A1 | 6/2015 | Longo et al. | |
| 2015/0170005 A1 | 6/2015 | Cohen et al. | |
| 2015/0213058 A1 | 7/2015 | Ambardekar et al. | |
| 2015/0228086 A1 | 8/2015 | Maurer et al. | |
| 2015/0379006 A1 | 12/2015 | Dorner et al. | |
| 2016/0342863 A1 | 11/2016 | Kwon et al. | |
| 2017/0017696 A1 | 1/2017 | Alonso | |
| 2017/0083752 A1 | 3/2017 | Saberian et al. | |
| 2017/0140236 A1 | 5/2017 | Price et al. | |
| 2017/0206431 A1 | 7/2017 | Sun et al. | |
| 2017/0255378 A1 | 9/2017 | Desai | |
| 2017/0277948 A1 | 9/2017 | Dhua et al. | |
| 2017/0287137 A1 | 10/2017 | Lin et al. | |
| 2018/0089203 A1* | 3/2018 | Soni ..................... | G06F 16/7837 |
| 2018/0108137 A1 | 4/2018 | Price et al. | |
| 2018/0121768 A1* | 5/2018 | Lin ....................... | G06K 9/6271 |
| 2018/0267997 A1 | 9/2018 | Lin et al. | |
| 2019/0019318 A1 | 1/2019 | Cinnamon et al. | |
| 2019/0108250 A1 | 4/2019 | Miller et al. | |
| 2019/0130229 A1 | 5/2019 | Lu et al. | |
| 2019/0252002 A1 | 8/2019 | Ding et al. | |
| 2019/0354609 A1 | 11/2019 | Huang et al. | |
| 2020/0020108 A1 | 1/2020 | Pao et al. | |
| 2020/0175344 A1 | 6/2020 | Li et al. | |
| 2020/0218931 A1 | 7/2020 | Karlinsky et al. | |
| 2020/0250538 A1 | 8/2020 | Li et al. | |
| 2020/0302230 A1 | 9/2020 | Chang et al. | |
| 2020/0334487 A1 | 10/2020 | Du et al. | |
| 2020/0334501 A1 | 10/2020 | Lin et al. | |
| 2021/0027448 A1 | 1/2021 | Cohen et al. | |
| 2021/0027471 A1 | 1/2021 | Cohen et al. | |
| 2021/0027497 A1 | 1/2021 | Ding et al. | |
| 2021/0192375 A1 | 6/2021 | Xia et al. | |

FOREIGN PATENT DOCUMENTS

| | | |
|---|---|---|
| EP | 3 300 024 A1 | 3/2018 |
| WO | WO 2017/007626 A1 | 1/2017 |

OTHER PUBLICATIONS

Examination Report as received in Australian application 2020202602 dated Oct. 18, 2021.
Intention to Grant as received in Australian application 2018250370 dated Oct. 21, 2021.
U.S. Appl No. 16/518,810, Oct. 27, 2021, Office Action.
U.S. Appl. No. 16/518,810, Jul. 15, 2021, Office Action.
U.S. Appl. No. 16/518,850, Jun. 18, 2021, Office Action.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2021, Notice of Allowance.
J. Uijlings, K. van de Sande, T. Gevers, and A. Smeulders. Selective Search For Object Recognition, IJCV, 2013.
Joseph Redmon, Santosh Divvala, Ross Girshick, Ali Farhadi: You Only Look Once: Unified, Real-Time Object Detection, arXiv:1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
U.S. Appl. No. 15/921,492, Dec. 27, 2019, Office Action.
Combined Search and Examination Report as received in UK Application GB2005865.7 dated Jan. 11, 2021.
Combined Search and Examination Report as received in United Kingdom Application GB2005704.8 dated Sep. 24, 2020.
Examination Report as received in Australian application 2020201988 dated Oct. 29, 2021.
U.S. Appl. No. 16/518,850, Nov. 4, 2021, Office Action.

(56) References Cited

OTHER PUBLICATIONS

Examination Report as received in Australian application 2018250370 dated Jun. 10, 2021.
U.S. Appl. No. 16/518,880, Apr. 7, 2021, Notice of Allowance.
U.S. Appl. No. 16/518,810, Apr. 16, 2021, 1st Action Office Action.
U.S. Appl. No. 16/518,795, May 6, 2021, Office Action.
U.S. Appl. No. 16/817,418, Mar. 22, 2021, Notice of Allowance.
U.S. Appl. No. 16/518,850, Apr. 6, 2021, Preinterview 1st Office Action.
U.S. Appl. No. 16/518,850, May 28, 2021, 1st Action Office Action.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. vol. 1908. International Society for Optics and Photonics, 1993. (Year: 1993).
Wan et al, Deep Learning for Content-Based Image Retrieval: Comprehensive Study, Published in MM '14: Proceedings of the ACM International Conference on Multimedia: Nov. 3-7, 2014, Orlando, pp. 157-166. http://doi.org/10.1145/2647868.2654948 (Year: 2014).
Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. in Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.
Intention to Grant as received in United Kingdom Application GB1817588.5 dated Aug. 13, 2020.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
U.S. Appl. No. 16/518,795, Dec. 7, 2021, Notice of Allowance.
Combined Search and Examination Report as received in United Kingdom Application GB2004362.6 dated Nov. 13, 2020.
U.S. Appl. No. 15/921,492, Apr. 2, 2020, Notice of Allowance.
Examination Report as received in Australian application 2020202601 dated Nov. 5, 2021.
Examination Report as received in United Kingdom application GB2005865.7 dated Dec. 14, 2021.
U.S. Appl. No. 16/518,850, Jan. 25, 2022, Office Action.
U.S. Appl. No. 16/518,810, Apr. 14, 2022, Office Action.
U.S. Appl. No. 16/919,383, Feb. 10, 2022, Notice of Allowance.
Notice of Grant as received in Australian application 2020201988 dated Mar. 17, 2022.
Intention to Grant as received in United Kingdom Application GB2005865.7 dated Mar. 23, 2022.
Intention to Grant as received in United Kingdom Application GB2004362.6 dated Apr. 8, 2022.
U.S. Appl. No. 16/518,810, dated Aug. 10, 2022, Office Action.
U.S. Appl. No. 16/518,850, dated Jun. 1, 2022, Notice of Allowance.

\* cited by examiner

610

| Object Term (noun) | Synonym |
|---|---|
| Lady | Woman, girl, female |
| Dude | Man, boy, guy, male |
| Chair | Recliner, armchair, sofa |
| Air | Sky, wind, ozone |
| Dog | K9, wolf, puppy, hound |

| Object Term (noun) | Hypernym |
|---|---|
| Lady | Adult, person, human |
| Dude | Adult, kid, person, human |
| Chair | Furniture, seat, bench |
| Air | Atmosphere, environment |
| Dog | Pet, animal, mammal |

| Selection Model | Performance (Mean IoU) |
|---|---|
| Baseline | 0.3036 |
| Baseline + Mapping Table | 0.4343 |
| Baseline + Component Graph + Mapping Table | 0.4972 |

*Fig. 13*

UTILIZING NATURAL LANGUAGE PROCESSING AND MULTIPLE OBJECT DETECTION MODELS TO AUTOMATICALLY SELECT OBJECTS IN IMAGES

BACKGROUND

Recent years have witnessed a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables digital image editing without significant lag time or processing delays. Similarly, improvements in software enable individuals to modify, combine, filter, or otherwise edit digital images. Examples of editing digital images include detecting an object, copying the object from one image into a new background, or removing an object from an image.

Notwithstanding these improvements in digital image editing, conventional systems have a number of problems in relation to flexibility, accuracy, and efficiency of operation with respect to image editing systems, and in particular, with respect to detecting and selecting objects in digital images. To illustrate, many conventional systems have limited functionality in their ability to select objects based on natural language sentence input. For example, when user input for selecting an object includes a slang term, many conventional systems are unable to recognize the term. Indeed, many conventional systems ignore the slang term as an unrecognized object, and, as a result, fail to select any object in the digital image. Similarly, many conventional systems are unable to recognize specialized or specific terms that include a high level of granularity. Again, conventional systems are too rigid to return adequate results.

As another example of inflexibility, many conventional systems cannot identify or process relationships between objects included in a natural language object selection request. For example, if the natural language object selection request requests selection of an object as it relates to another object, many conventional systems cannot correctly identify which object to select. Further, while a small number of conventional systems have recently begun to address this issue, these conventional systems are limited to a generic relationship operator that can only handle simplistic relationships.

In addition, conventional systems are inaccurate. For instance, as mentioned above, many conventional systems fail to recognize one or more object terms in a natural language object selection request. Accordingly, these conventional systems fail to provide the user with any results. Alternatively, some conventional systems incorrectly recognize an object term and return an incorrect object. In either case, the conventional systems provide the user with incorrect, imprecise, and inaccurate results. Similarly, when conventional systems fail to distinguish the relationship between multiple objects in a natural language object selection request, these conventional systems cannot return accurate results to the user.

Furthermore, conventional systems are inefficient. For example, conventional systems have significant shortfalls in relation to automatic object detection and selection. For instance, when a conventional system provides an inaccurate result, the conventional system wastes computer processing resources and real-time memory. As another example, many conventional systems that detect objects are end-to-end neural networks. When a fault occurs, or the desired result is not achieved, users or even creators of the system are unable to locate which component of the system is not working properly. Rather, the entire system must be retrained and adjusted until the desired result is achieved—a process that can take significant amounts of time and computing resources.

Moreover, many conventional systems provide inefficient mouse input-based tools that further require users to manually select a desired object. These tools are often imprecise as well as difficult for many selection tasks. As a result, significant time and user interactions with different selection tools by the user waste substantial computing resources in detecting, displaying, selecting, and correcting object selections in digital images.

These, along with additional problems and issues exist in image editing systems with respect to detecting and selecting objects in digital images.

BRIEF SUMMARY

Implementations of the present disclosure provide benefits and/or solve one or more of the foregoing or other problems in the art with systems, non-transitory computer-readable media, and methods for automatically selecting detected objects in a digital image based on natural language-based inputs. For instance, the disclosed systems can utilize natural language processing tools to detect objects and their corresponding relationships within natural language object selection queries. For example, the disclosed systems determine alternative object terms for unrecognized objects in a natural language object selection query. As another example, the disclosed systems identify multiple types of relationships between objects in a natural language object selection query and utilize different object relationship models to select the requested query object. As a further example, the disclosed systems can utilize an object selection pipeline made up of interchangeable object detection neural networks and models to accurately detect and automatically select the query object identified in the natural language object selection query.

The following description sets forth additional features and advantages of one or more implementations of the disclosed systems, computer media, and methods.

BRIEF DESCRIPTION OF THE DRAWINGS

The detailed description provides one or more implementations with additional specificity and detail through the use of the accompanying drawings, as briefly described below.

FIGS. 6A-6B illustrate multiple mapping tables utilized to identify alternative mapping terms of a query object in accordance with one or more implementations.

FIG. 13 illustrates a table evaluating various implementations of the object selection system in accordance with one or more implementations.

DETAILED DESCRIPTION

Figure 1:
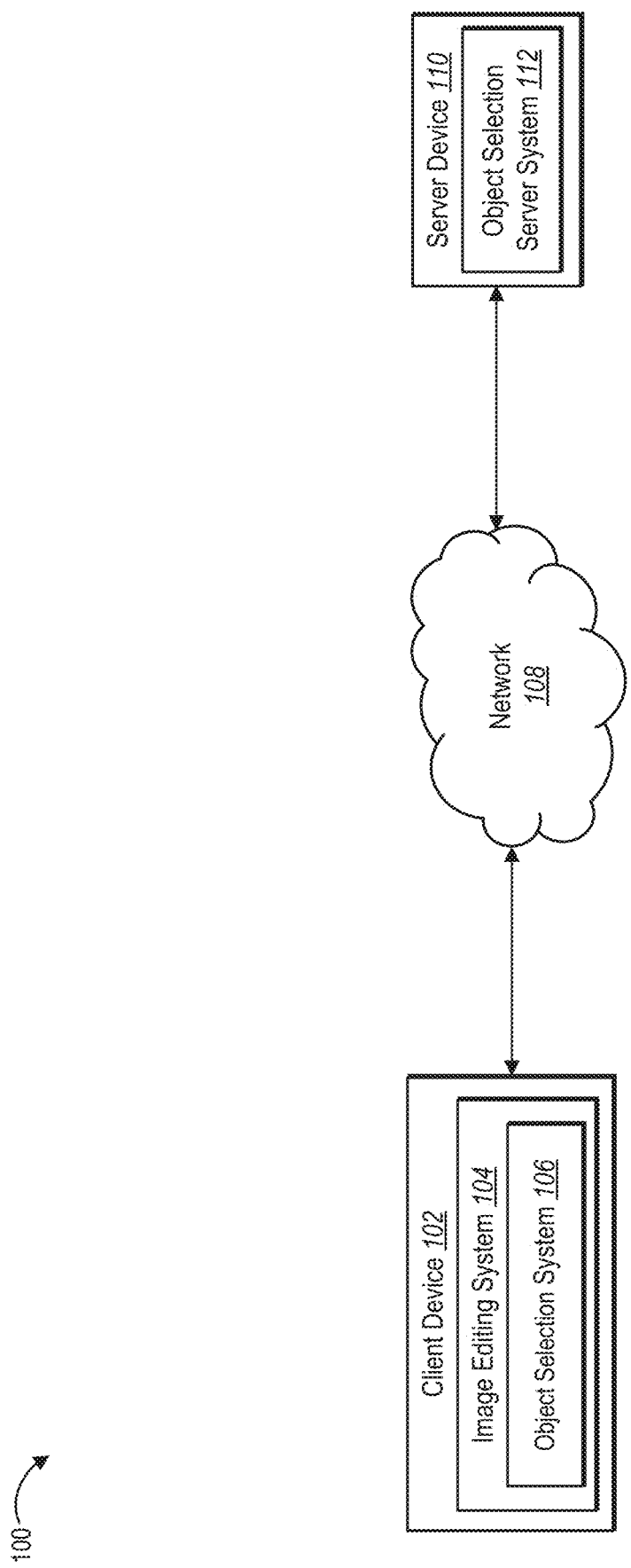
FIG. 1 illustrates a schematic diagram of an environment in which an object selection system can operate in accordance with one or more implementations.

This disclosure describes one or more implementations of an object selection system that accurately detects and automatically selects user-requested objects (e.g., query objects) in a digital image. In particular, in one or more implementations, the object selection system utilizes one or more natural language processing tools to identify object terms and relationships within a natural language object selection query. Additionally, the object selection system can build and update an object selection pipeline to select a requested query object from among more or more query objects indicated in the natural language object selection query. Further, the object selection system can add, update, or replace portions of the object selection pipeline to improve the overall accuracy and efficiency of automatic object selection within an image.

As an overview, the object selection system can generate and utilize an object selection pipeline to detect objects within a query string (i.e., a natural language object selection query). In general, the object selection pipeline includes multiple object detection models (e.g., neural networks) that are designed to identify different classes of objects. For example, the object selection pipeline can include specialized-class object detection models, known-class object detection models, a concept-based object detection model, and/or a large-scale object detection model. In this manner, the object selection system can utilize the object detection model that most accurately and efficiently detects an object identified from the query string.

The object selection system can utilize natural language processing tools to detect a query object from multiple objects indicated in a natural language object selection query. To illustrate, in one or more implementations, the object selection system generates a component graph to identify multiple objects (and/or object classes) from a query string (i.e., a natural language object selection query). Additionally, the object selection system can identify a relationship type from the component graph and, based on the relationship type, identify an object relationship model from among multiple object relationship models. Further, the object selection system can generate object masks for each of the identified objects and analyze the object masks to determine an object that satisfies the object relationship model (e.g., the query object). Moreover, the object selection system can provide the query object selected within a digital image in response to the natural language object selection query.

The object selection system can utilize one or more object relationship models to detect a query object from a query string. For example, in various implementations, the object selection system generates a component graph or tree that indicates each of the objects (or object classes) included in a query string as well as a relationship type between objects. For each of the objects, the object selection system can utilize the object selection pipeline to identify a targeted object detection model that will accurately detect the object and/or generate an object mask for each detected instance of the object.

In additional implementations, the object selection system can determine an object relationship model based on the relationship type indicated in the component graph. For instance, based on the relationship type, the object selection system selects a target object relationship model from multiple object relationship models. To illustrate, the object selection system can determine an object relationship model from among an object touching model, a relative object position model, a background/foreground object model, or another object relationship model. Upon selecting a target object relationship model, the object selection system can determine which of the detected objects satisfies the target object relationship model, which the object selection system can then select as the query object to providing within the digital image.

In additional implementations, or in the alternative, the object selection system can utilize natural language processing tools that determine alternative object terms to detect a query object. To illustrate, in one or more implementations, the object selection system identifies a query object from a natural language object selection query. Based on the identified query object, the object selection system determines that the query object does not correspond to any known object class recognized by a known object class detection model. Accordingly, the object selection system can utilize a mapping table to identify one or more alternative object terms for the query object. Based on one of the alternative object terms, the object selection system can utilize a known object class detection model to detect and generate an object mask for the query object. Additionally, the object selection system can provide the selected query object within a digital image in response to the natural language object selection query.

Thus, the object selection system can utilize a mapping table to identify one or more alternative object terms for the query object or other objects detected in a query string. In various implementations, the object selection system utilizes the mapping table to identify synonyms of an object determined to correspond to an unknown object class (e.g., an unrecognized object). In some implementations, the mapping table provides hypernyms of an unrecognized object.

By providing synonyms and/or hypernyms as alternative object terms for an object of an unrecognized class, the object selection system can more efficiently and accurately detect the object. For example, when the object selection system does not recognize an object in the query string, the object selection system would attempt to detect the object utilizing the large-scale detector that detects objects having an unknown object class. However, if the object selection system recognizes a synonym of the object as belonging to a known object class, the object selection system can utilize the known-class object detection neural network to detect the object accurately and efficiently. Similarly, the object selection system can more accurately detect hypernyms of an unrecognized object using a targeted object detection model of the object selection pipeline.

Additionally, depending on if the object selection system detects a synonym or a hypernym, the object selection system can modify the object selection pipeline. For example, if the object selection system utilizes a hypernym for an unrecognizable object, the object selection system can preclude various paths and/or object detection models from the object selection pipeline, as described below. Further, the object selection system can add additional stages to the object selection pipeline, such as a verification stage, depending on if the object is a synonym or a hypernym.

As previously mentioned, the object selection system provides numerous advantages, and benefits over conventional systems via a practical application (e.g., automatically selecting objects within images utilizing one or more natural language processing tools). For example, the object selection system can automatically detect and select objects across a large scope of object types and classes based on natural language user input (i.e., a natural language object selection query). Indeed, the object selection system can utilize various natural language processing tools and techniques to detect objects that conventional systems would otherwise not detect, or only detect using unnecessary amounts of computing resources. Accordingly, the object selection system provides increased flexibility, improved efficiency, and expanded functionality over conventional systems.

To illustrate, the object selection system provides increase flexibility by detecting objects that are unrecognizable or that do not belong to a known object class. For example, the object selection system can recognize objects in a natural language object selection query indicated using slang terms not recognized by conventional systems. Similarly, the object selection system can recognize objects in a natural language object selection query indicated using very granular or specific terms also not recognized by conventional systems. In this manner, the object selection system can flexibly extend the breadth and range of objects that are able to be detected by more accurate and efficient object detection models (e.g., specialist object detection models and known object class detection models).

Additionally, the object selection system provides increased accuracy over conventional systems. For instance, the object selection system improves object detection accuracy by better identifying objects indicated in a natural language object selection query. Indeed, if a conventional system does not recognize an object term, the conventional system largely is unable to detect the object. In the cases that the conventional system can use a generic object detection network to detect the object, the conventional system often returns the wrong object or an imprecise selection of the object. In contrast, by utilizing the natural language processing tools and techniques described herein, the object selection system can utilize specialist object detection models or known object class detection models to accurately identify the object.

As another example, by utilizing a targeted object relationship model, the object selection system can more accurately identify a query object. Indeed, each of the object relationship models is tailored to particular types of object relationships between objects. Thus, by utilizing the object relationship model that corresponds to the relationship type between objects, the object selection system can achieve much more accurate results than conventional systems that use a generic one-size-fits-all relationship model. Indeed, in many cases, the generic relationship model is unable to recognize or correctly apply the relationship between objects.

Further, the object selection system provides improved efficiency over conventional systems by utilizing targeted object detection models as well as utilizing the object selection pipeline. For example, utilizing a specialist object detection model or a known object class detection model to detect an object is more efficient and accurate than utilizing a generic object detection network that includes many additional steps to identify an object. Similarly, utilizing a target object relationship model is more efficient and requires fewer computations and steps than utilizing a generic relationship model.

Moreover, unlike closed end-to-end conventional systems, when a fault occurs, the object selection system can pinpoint the faulty component in the object selection pipeline and repair the component. Further, the object selection system can add additional components to improve accuracy. For example, the object selection system can add additional specialist object detection neural networks to the object selection pipeline that correspond to frequently queried objects. Similarly, the object selection system can replace and/or upgrade components within the object selection pipeline with more efficient versions.

Additionally, the object selection system significantly reduces the number of actions that many conventional systems require of users to select an object within an image. Rather than the user using inefficient mouse input-based tools to manually select an object, the user "tells" (e.g., provides verbal cues in a natural language object selection query or query string) the object selection system which object to select and the object selection system automatically detects and accurately selects the object. Indeed, the object selection system greatly simplifies the object selection process to one or two simple actions to achieve precise results by the user rather than a large number of steps previously required to only achieve mediocre results.

Additional advantages and benefits of the object selection system will become apparent in view of the following description. Further, as illustrated by the foregoing discussion, the present disclosure utilizes a variety of terms to describe features and advantages of the object selection system. Before describing the object selection system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various implementations, an image editing system displays an image on a computing device, such as a client device. In additional implementations, the image editing system enables a user to modify or change an image as well as generate new images. For example, the image editing system enables a user to copy an object selected in a first image over the background of a second image. Additionally, a digital image can include one or more frames in a video or animation along with other digital images.

The term "object," as used herein, refers to a visual representation of a subject, concept, or sub-concept in an image. In particular, an object refers to a set of pixels in an image that combine to form a visual depiction of an item, article, partial item, component, or element. An object can correspond to a wide range of classes and concepts. For example, objects include specialty objects, object categories (e.g., conceptual objects), object classes, objects from known-classes, and unknown object classes (e.g., objects not used in training any of the object detection neural networks). In some implementations, an object includes multiple instances of the object. For example, an image of a rose bush includes multiple instances of roses or the object term of "furniture" can include the sub-groupings of a chair, desk, and couch. In one or more implementations, an object includes sub-objects, parts, or portions. For example, a person's face or leg can be objects that are part of another object (e.g., the person's body). As another example, a shirt is an object that can be part of another object (e.g., a person).

As mentioned above, the object selection system can accurately detect and automatically select an object within an image based on a query string. As used herein, the term "natural language object selection query," or interchangeably "query string," refers to a text string of one or more object terms (i.e., words) that indicates a target object. A query string can be natural language user input that includes a noun representing a query object. In addition, a query string can include object terms for other objects that have a relationship with the query object. In general, the object selection system receives a query string when a user requests the object selection system to automatically select an object in an image. In some implementations, the query string is submitted as a text string. In alternative implementations, the object selection system detects alternative user input, such as voice data, and converts the alternative user input into text to obtain the query string.

As just mentioned, a query string can include a query object. The term "query object" refers to the object in the query string that is being requested by the user for detection and selection. For example, a noun in the query string indicates the query object. Largely, if a query string includes multiple objects (e.g., multiple nouns), the query object is the first listed object. In additional implementations, the query string includes additional words, such as adjectives and adverbs that indicate attributes of the query object. Further, as noted above, the query string can include other nouns (and corresponding attributes) that indicate a relationship to the query object. As used herein, the term "object attribute" refers to a descriptive word further identifying the query object. Examples of object attributes include color, size, length, shape, position, location, pattern, composition, expression, emotion, rigidity, and/or flexibility.

As used herein, the term "alternative object term" refers to a substitute term for an object or object term in a query string. In one or more implementations, an alternative object term includes a synonym of an object term in a query string. In some implementations, an alternative object term includes a hypernym of the object term in a query string. In various implementations, an alternative object term includes a hyponym of the object term in a query string. As described herein, the object selection system can utilize one or more mapping tables to identify an alternative object term for an object term in a query string.

The term, "mapping table," as used herein, refers to a data structure that associates related words together. For example, a mapping table is a database, chart, or list that includes terms (e.g., object terms) and corresponding alternative object terms. A mapping table can provide synonyms, hypernyms, hyponyms, and/or other terms for a given term. In some implementations, the object selection system utilizes multiple mapping tables, such as a synonym mapping table and a hypernym mapping table. The mapping table can be updated at regular intervals or upon the object selection system detecting new alternative object terms for a given object term.

As used herein, the terms "object mask," "segmentation mask," or "object segmentation" refer to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

As used herein, the term "approximate boundary" refers to an indication of an area including an object that is larger and/or less accurate than an object mask. In one or more implementations, an approximate boundary can include at least a portion of a query object and portions of the image not comprising the query object. An approximate boundary can include any shape, such as a square, rectangle, circle, oval, or other outline surrounding an object. In one or more implementations, an approximate boundary comprises a bounding box.

The term "object selection pipeline" refers to a collection of components and actions utilized to detect and select a query object in an image. In various implementations, the object selection system utilizes a subset of the components and actions in the object selection pipeline to detect and select a query object in an image, where output from one component is provided as input to another component. The components and actions can include neural networks, machine-learning models, heuristic models, and/or functions. Further, the components and actions in the object selection pipeline can be interchangeable, removable, replaceable, or upgradable, as described in further detail below.

As used herein, the term "component graph" refers to a data structure that characterizes objects and relationships derived from a query string. For example, a component graph is a data tree that includes multiple objects to be detected and a relationship type between the multiple objects. In one or more implementations, a component graph includes the components of "locate," "relate," and "intersect," where "locate" indicates one or more objects to detect, "relate" indicates a relationship type, and "intersect" indicates an object relationship between objects based on the relationship type. Additional detail regarding component graphs and an example of a component graph is provided with respect to FIG. 9B.

The term "relationship type" refers to a characteristic of how objects in a query string (e.g., in a digital image) relate to one another. For instance, a relationship type provides an indication of the object relationship (e.g., spatial relationship) between two or more objects. Examples of relationship type can include, but are not limited to spatial, proximity relationships, depth relationships, relative position relationships, absolute position relationships, and exclusion relationships.

As mentioned above, the object selection system can utilize object relationship models to identify a query object in an image. As used herein, the term "object relationship model" refers to a relationship operator that can select an input object (i.e., the query object) based on its relationship to one or more input objects. In various implementations, an object relationship model utilizes heuristics and/or rules to select the query object. In some implementations, the object relationship model utilizes a machine-learning approach. Examples of object relationship models include, but are not limited to, an object touching model, a relative object position model, and a background/foreground object model.

As mentioned above, the object selection system can utilize machine learning and various neural networks in various implementations. The term "machine-learning model" refers to a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data. The term machine-learning model can include linear regression models, logistical regression models, random forest models, support vector machines (SVG) models, neural networks, or decision tree models. Thus, a machine-learning model can make high-level abstractions in data by generating data-driven predictions or decisions from the known input data.

Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, an object category detection neural network, and/or a selected object attribute detection neural network), data-based models (e.g., a natural language processing model, a large-scale object detection model, an unknown object class detection model, an object recognition model, a filtering model, and/or a selection object attribute model), or a combination of networks and models.

As used herein, the term "neural network" refers to a machine learning model that includes interconnected artificial neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), residual learning neural network, recurrent neural network (RNN), graph neural network, generative adversarial neural network (GAN), Region-CNN (R-CNN), Faster R-CNN, Mask R-CNN, and single-shot detect (SSD) networks.

Referring now to the figures, FIG. 1 illustrates a schematic diagram of an environment 100 in which the object selection system 106 can operate in accordance with one or more implementations. As shown in FIG. 1, the environment 100 includes a client device 102 and a server device 110 connected via a network 108. Additional detail regarding computing devices (e.g., the client device 102 and the server device 110) is provided below in connection with FIG. 17. In addition, FIG. 17 also provides additional detail regarding networks, such as the illustrated network 108.

Although FIG. 1 illustrates a particular number, type, and arrangement of components within the environment 100, various additional environment configurations are possible. For example, the environment 100 can include any number of client devices. As another example, the server device 110 can represent a set of connected server devices. As a further example, the client device 102 may communicate directly with the server device 110, bypassing the network 108 or utilizing a separate and/or an additional network.

As shown, the environment 100 includes the client device 102. In various implementations, the client device 102 is associated with a user (e.g., a user client device), such as a user that requests automatic selection of an object in an image. The client device 102 can include an image editing system 104 and an object selection system 106. In various implementations, the image editing system 104 implements the object selection system 106. In alternative implementations, the object selection system 106 is separate from the image editing system 104. While the image editing system 104 and the object selection system 106 are shown on the client device 102, in some implementations, the image editing system 104 and the object selection system 106 are located remotely from the client device 102 (e.g., on the server device 110), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more implementations, the image editing system 104 operates in connection with digital design applications or other image editing applications.

In some implementations, the image editing system 104 provides an intelligent image editing assistant that performs one or more automatic image editing operations for the user. For example, the image editing system 104 receives a natural language object selection query (or query string) that inputs, "make the red dress yellow," "blur the background and make it gray," or "increase the contrast on the water." As part of fulfilling the request, the image editing system 104 utilizes the object selection system 106 to automatically select the corresponding query object identified in the query string. The image editing system 104 can then utilize additional system components (e.g., a color replacement tool, a blur filter, or an image adjustment tool) to perform the requested operation with respect to the detected query object.

As mentioned above, the image editing system 104 includes the object selection system 106. As described in detail below, the object selection system 106 accurately detects and automatically selects objects in an image based on a user's request (e.g., a user-provided query string). The object selection system 106, in many implementations, utilizes natural language processing tools and an object selection pipeline to determine which object detection neural networks to utilize based on the query object as well as which additional neural networks and/or models to utilize to select the particular requested query object.

As shown, the environment 100 also includes the server device 110. The server device 110 includes an object selection server system 112. For example, in one or more implementations, the object selection server system 112 represents and/or provides similar functionality as described herein in connection with the object selection system. In some implementations, the object selection server system 112 supports the object selection system 106 on the client device 102.

Indeed, in one or more implementations, the server device 110 can include all, or a portion of, the object selection system 106. In particular, the object selection system 106 on the client device 102 can download an application from the server device 110 (e.g., an image editing application from the object selection server system 112) or a portion of a software application.

In some implementations, the object selection server system 112 can include a web hosting application that allows the client device 102 to interact with content and services hosted on the server device 110. To illustrate, in one or more implementations, the client device 102 accesses a web page supported by the server device 110, which hosts the models that allow for automatic selection of objects in images based on the user providing a query string via the client device 102. As another example, the client device 102 includes an image editing application that provides the image and the query string to the object selection server system 112 on the server device 110, which then detects the query object utilizing one or more natural language processing tools as well as one or more object detection models and provides an object mask of the detected query object back to the client device 102. Then, utilizing the object mask, the image editing application on the client device 102 selects the detected query object.

Figure 2:
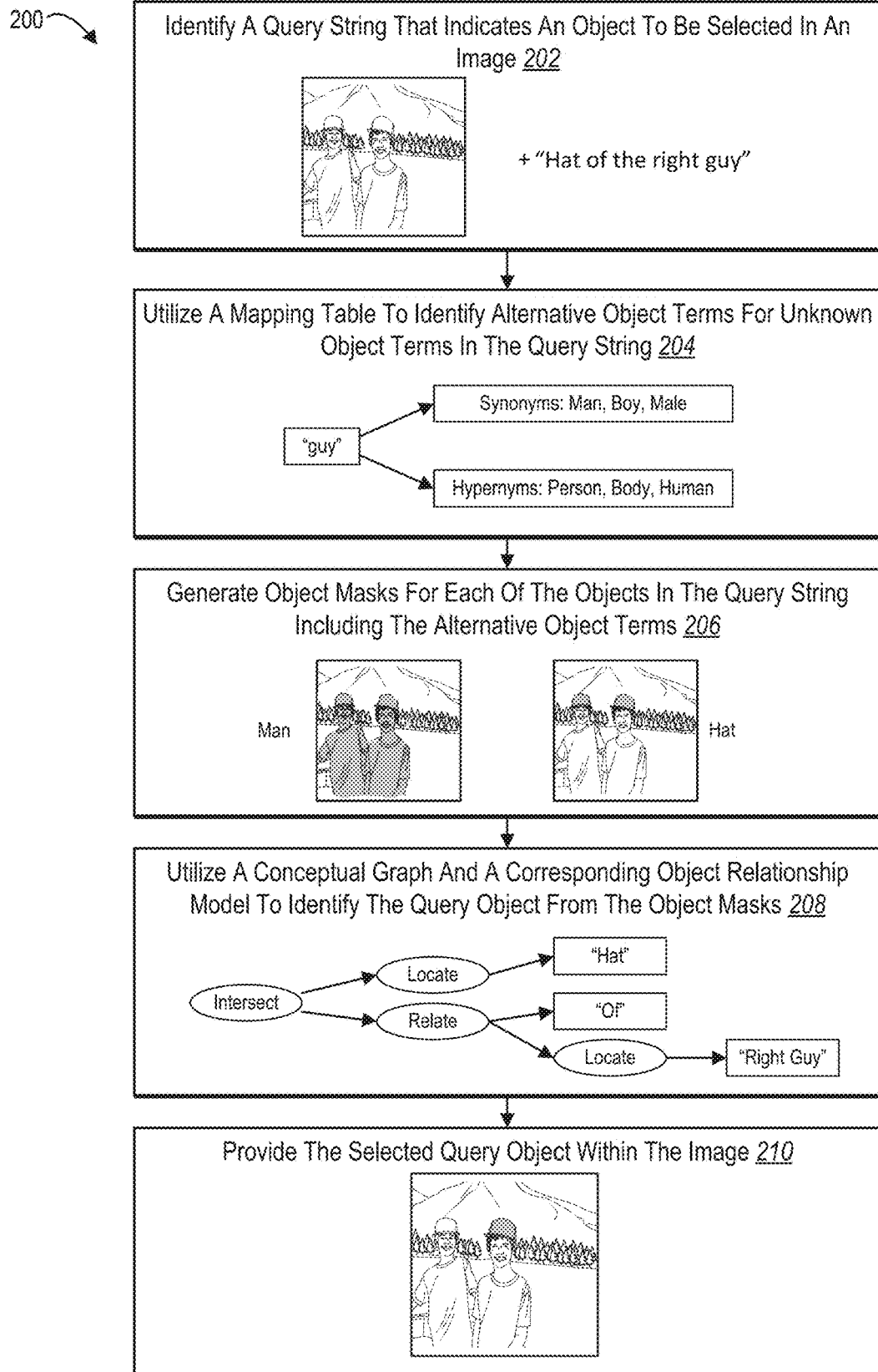
FIG. 2 illustrates a schematic diagram of automatically detecting and selecting a query object in an image based on natural language user input in accordance with one or more implementations.

Turning to the next figure, FIG. 2 provides an overview of utilizing the object selection system to automatically select an object in an image. In particular, FIG. 2 illustrates a series of acts 200 of automatically detecting and selecting a query object in an image based on natural language user input in accordance with one or more implementations. In various implementations, the object selection system 106 performs the series of acts 200. In some implementations, an image editing system and/or image editing application performs one or more of the acts included in the series of acts 200.

As shown in FIG. 2, the object selection system 106 performs an act 202 of identifying a query string that indicates an object to be selected in an image. For example, a user utilizes an image editing program to edit an image. While editing the image, the user desires to select a particular object within the image. Accordingly, the object selection system 106 provides the user with a graphical interface that enables the user to enter a query string requesting automatic selection of the object. The object selection system 106 can enable the user to provide the query string as typed text or spoken words that the object selection system 106 then converts to text. As shown in FIG. 2 in connection with the act 202, the object selection system 106 can receive a query string of "hat of the right guy."

In response to detecting a query string, the object selection system 106 performs the act 204 of utilizing a mapping table to identify alternative object terms for unknown object terms in the query string. For example, the object selection system 106 analyzes the query string and determines that the object term of "hat" corresponds to a known object class. However, the object selection system 106 also determines that the object term of "guy" is not recognized as belonging to a known object class. Accordingly, the object selection system 106 can utilize a mapping table to look up alternative object terms, such as synonyms or hypernyms. As shown, the object selection system 106 identifies alternative object terms of "man," "boy," and "male" for the unrecognized object term of "guy." Additional detail regarding utilizing mapping tables and alternative object terms is provided below with respect to FIGS. 5-7D.

As shown, the series of acts 200 includes the act 206 of the object selection system 106 generating object masks for each of the objects in the query string including the alternative object terms. For example, upon identifying objects in the query string, either directly or based on an alternative object term, the object selection system 106 can utilize the object selection pipeline to generate masks of each of the objects. As shown in connection with the act 206, the object selection system 106 has generated an object mask for each man (e.g., the alternative object term for "guy") and both hats. Additional detail regarding utilizing the object selection pipeline is provided below in connection with FIG. 4. As an example, the object selection system 106 can use an object detection model trained to select people based on mapping the query term to man using the mapping table.

In some instances, the object selection system 106 detects multiple objects in the query string. For example, selecting the query object is predicated on another object indicated in the query string. Accordingly, as shown, the series of acts 200 includes the act 208 of the object selection system 106 utilizing a component graph and a corresponding object relationship model to identify the query object from the object masks.

In various implementations, as part of the act 208, the object selection system 106 can generate a component graph from the query string that locates objects in the query string and indicates relationships between the objects. As described below, the object selection system 106 can utilize the relationship types to choose a target object relationship model to determine the query object from the objects in the query string. In this example, the object selection system 106 can use the object relationship model to identify the relationship between the two men to identify the man on the right. Additional detail regarding utilizing a component graph and object relationship model to identify the query object is provided below with respect to FIGS. 8-12D.

As illustrated in FIG. 2, the series of acts 200 includes the act 210 of the object selection system 106 providing the selected query object within the image. For example, the object selection system 106 provides the image on a computing device with the query object automatically selected in response to receiving the query string. As shown, the image has the hat of the boy on the left selected. In additional implementations, the object selection system 106 can automatically perform additional steps with the selected query object based on instructions detected in the query string, such as "change the hat of the right guy to blue."

The object selection system 106 can perform the acts 202-210 in a variety of orders. For example, the object selection system 106 can perform the act 208 of utilizing a component graph before performing the act 206 of generating object masks. In some implementations, the object selection system 106 omits the act 208 utilizing a component graph.

FIGS. 3A-3D illustrate a client device 300 having a graphical user interface 302 that illustrates a process of selecting a query object in an image 304 based on an object detection request (i.e., a natural language object selection query) in accordance with one or more implementations. The client device 300 in FIGS. 3A-3B can represent the client device 102 introduced above with respect to FIG. 1. For instance, the client device 300 includes an image editing application that implements the image editing system 104 having the object selection system 106. For example, the graphical user interface 302 in FIGS. 3A-3B can be generated by the image editing application.

Figure 3A:
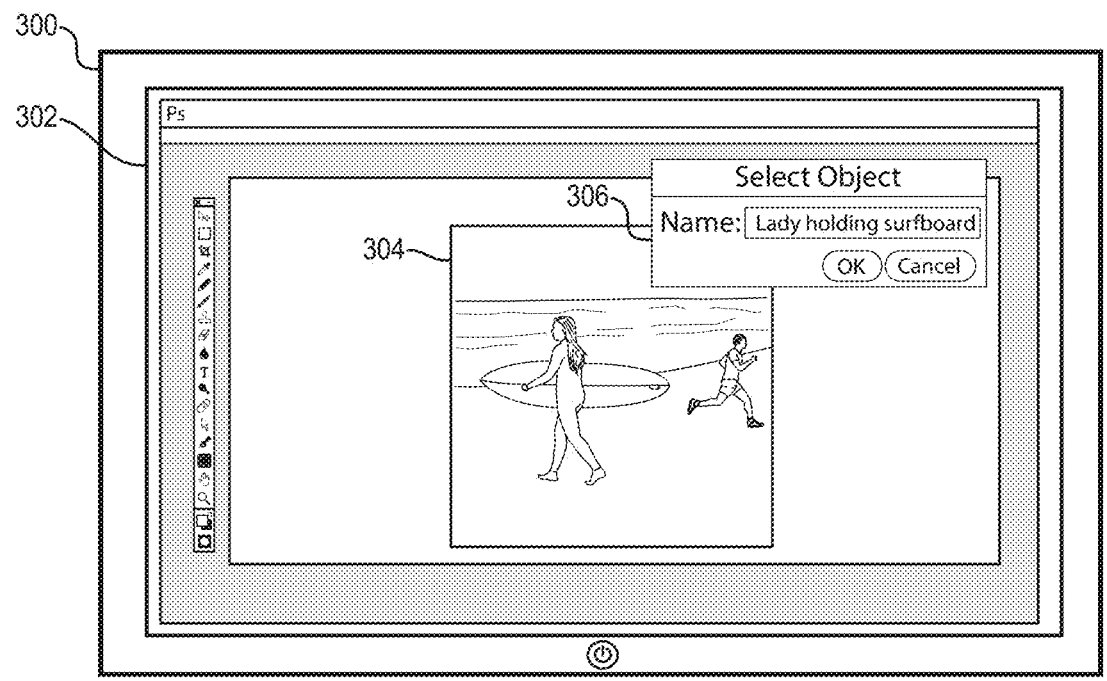
FIGS. 3A-3D illustrate a graphical user interface showing a process of automatically detecting and selecting a query object in an image in accordance with one or more implementations.

As shown in FIG. 3A, the graphical user interface 302 includes the image 304 within an image editing application. The image 304 shows a woman holding a surfboard on the beach going into the water on the left of the image and a man running along the beach on the right of the image. For ease in explanation, the image 304 is simplified and does not include additional objects or object classes.

The image editing system and/or the object selection system 106 can, in response to detecting a user selecting an option to have an object automatically selected, provide an object selection interface 306. For example, the object selection system 106 provides the object selection interface 306 as a selection tool within the image editing application. As shown, the object selection interface 306 can include a text field where a user can enter a natural language object selection query in the form of a query string (i.e., "Lady holding surfboard"). The selection interface 306 also includes selectable options. For example, the object selection interface includes a selectable element to confirm (i.e., "OK") or cancel (i.e., "Cancel") the object detection request. In some implementations, the object selection interface 306 includes additional elements, such as a selectable option to capture audio input from a user dictating the query string.

Based on detecting the query string from the object detection request, the object selection system 106 can initiate detecting and selecting the query object. For instance, as described in detail below, the object selection system 106 utilizes natural language processing tools to identify objects in the query string as well as classify the objects as known objects, specialty objects, object categories, or unknown objects.

To illustrate, the object selection system 106 can generate a component graph to determine that the query string includes multiple objects (i.e., "lady" and "surfboard") as well as a relationship between the two objects (i.e., "holding"). Additionally, the object selection system 106 can classify each of the objects identified in the query string, such as classifying the term of "lady" as belonging to an unknown object class and classifying the term of "surfboard" as belonging to a known object class. Further, upon determining that the object term "lady" is not recognized or unknown, the object selection system 106 can utilize a mapping table to find alternative object terms, such as identifying the alternative object term of "person," which corresponds to a known object class.

Figure 3B:
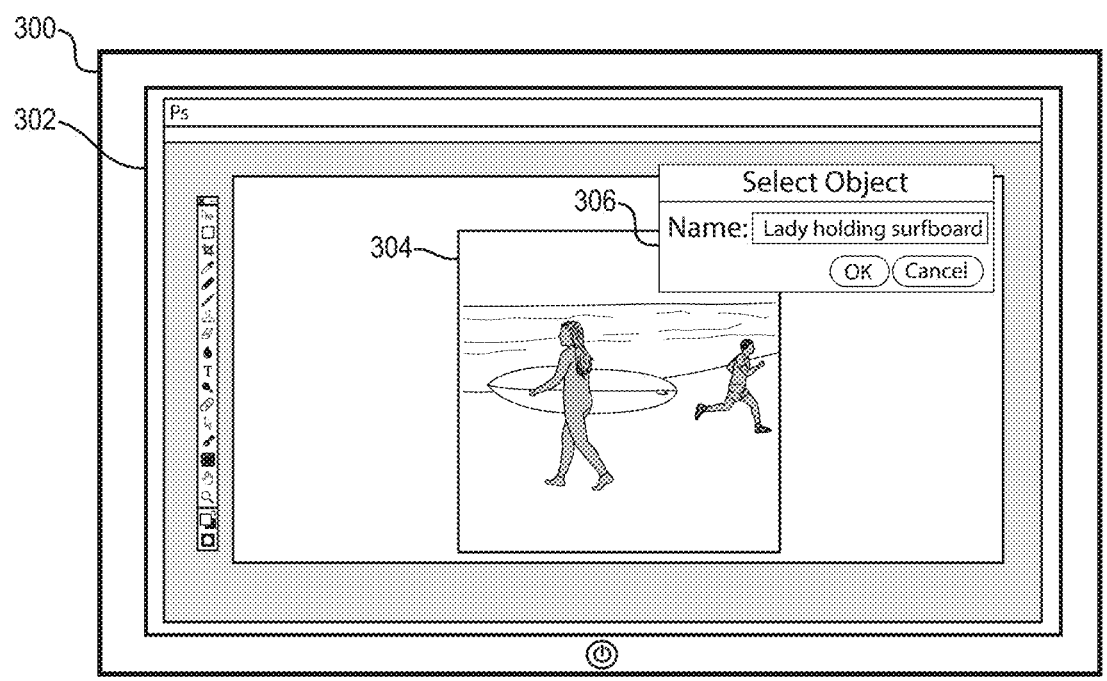

Utilizing the identified objects in the query string, the object selection system 106 can utilize an object selection pipeline. For instance, based on the classification of an object, the object selection system 106 can select an object detection model that will most efficiently and accurately detect the corresponding object. For example, by using the term of "person," the object selection system 106 can select a specialist object detection model to detect each of the persons included in the image 304. Further, the specialist object detection model and/or an additional object mask model can generate object masks of the two persons, as illustrated in FIG. 3B.

Figure 3C:
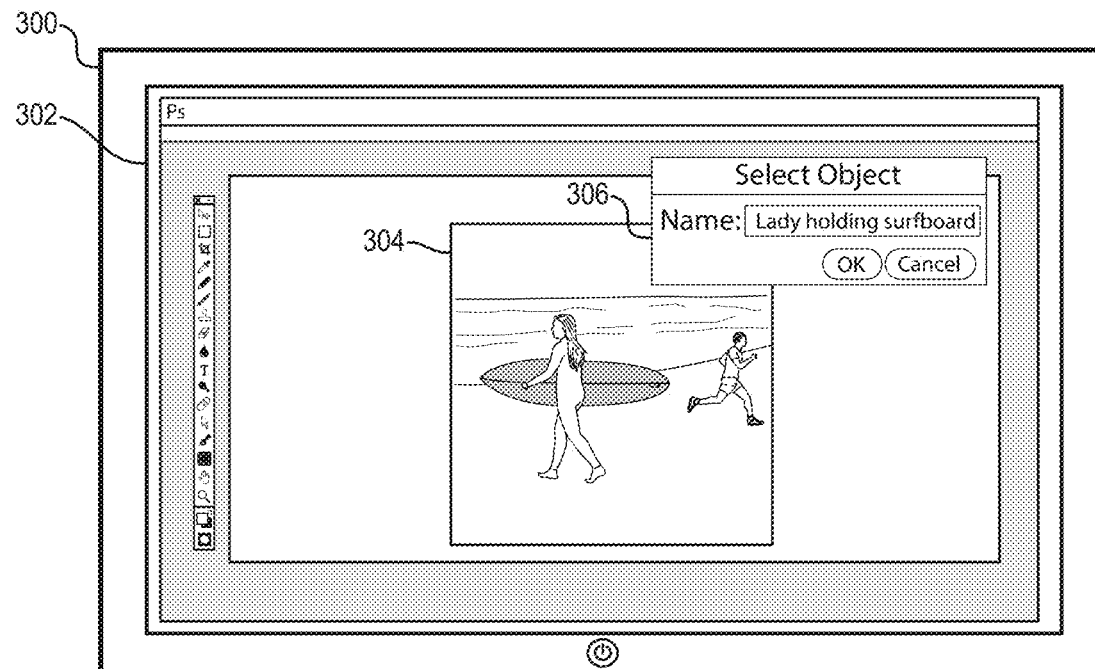

Similarly, the object selection system 106 can utilize the object selection pipeline to select a known class object detection model to detect the surfboard in the image 304, and in some cases, also generate an object mask of the surfboard. To illustrate, FIG. 3C shows a mask of the surfboard in the image 304.

As mentioned above, the object selection system 106 can isolate the query object from detected objects. For example, in various implementations, the object selection system 106 can utilize the relationship type indicated in the component graph to select an object relationship model. As noted previously, the component graph can indicate a relationship of "holding" between the lady (i.e., person) and the surfboard. Thus, based on the relationship type, the object selection system 106 can select an object relationship model that is tailored to find the intersection of a first object "holding" a second object.

In one or more implementations, the object relationship model utilizes a machine-learning model to determine the intersection between the two objects. In alternative implementations, the object relationship model utilizes heuristic models. In either case, the object selection system 106 utilizes the selected object relationship model to determine a query object by finding an intersecting object mask that satisfies the object relationship model.

Figure 3D:
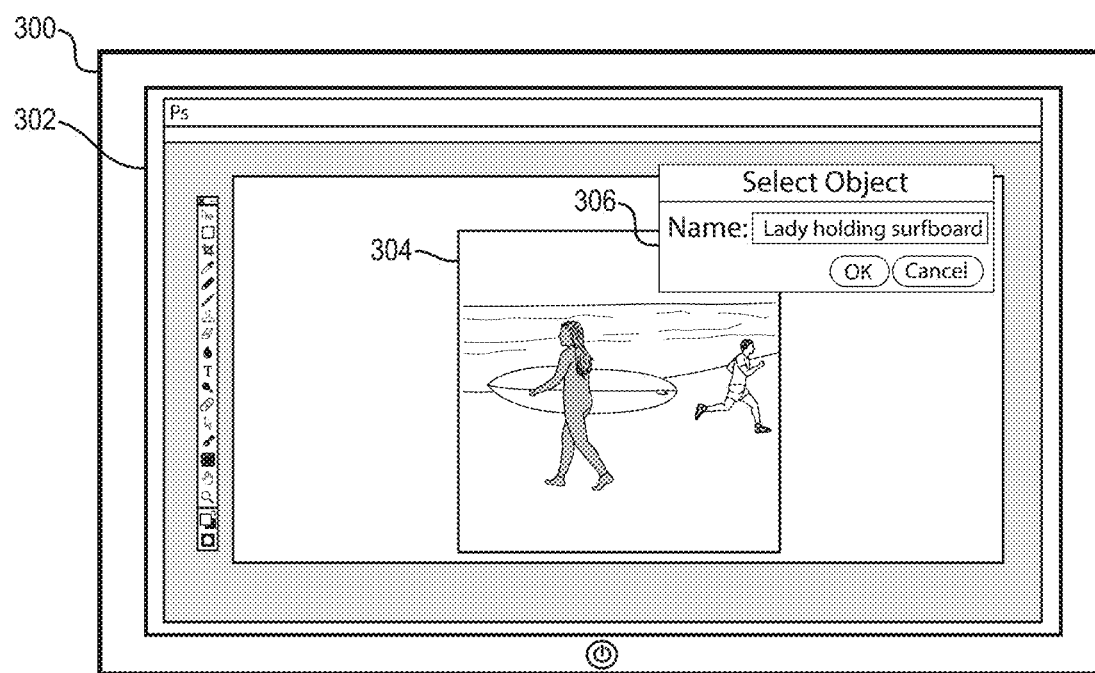

To illustrate, FIG. 3D shows the result of the query string. In particular, FIG. 3D shows an object mask selecting the lady holding the surfboard (and not the surfboard or the man running). In this manner, the user is able to easily modify the lady as desired within the image 304 within the image editing application. In addition, in various implementations, the object selection system 106 can provide the automatically selected lady in response to the query string without showing the intermediate steps associated with FIGS. 3B and 3D. Indeed, in response to detecting the query string in FIG. 3A, the object selection system 106 can automatically skip to providing the result shown in FIG. 3D, while the intermediate steps are performed in the background.

Figure 4:
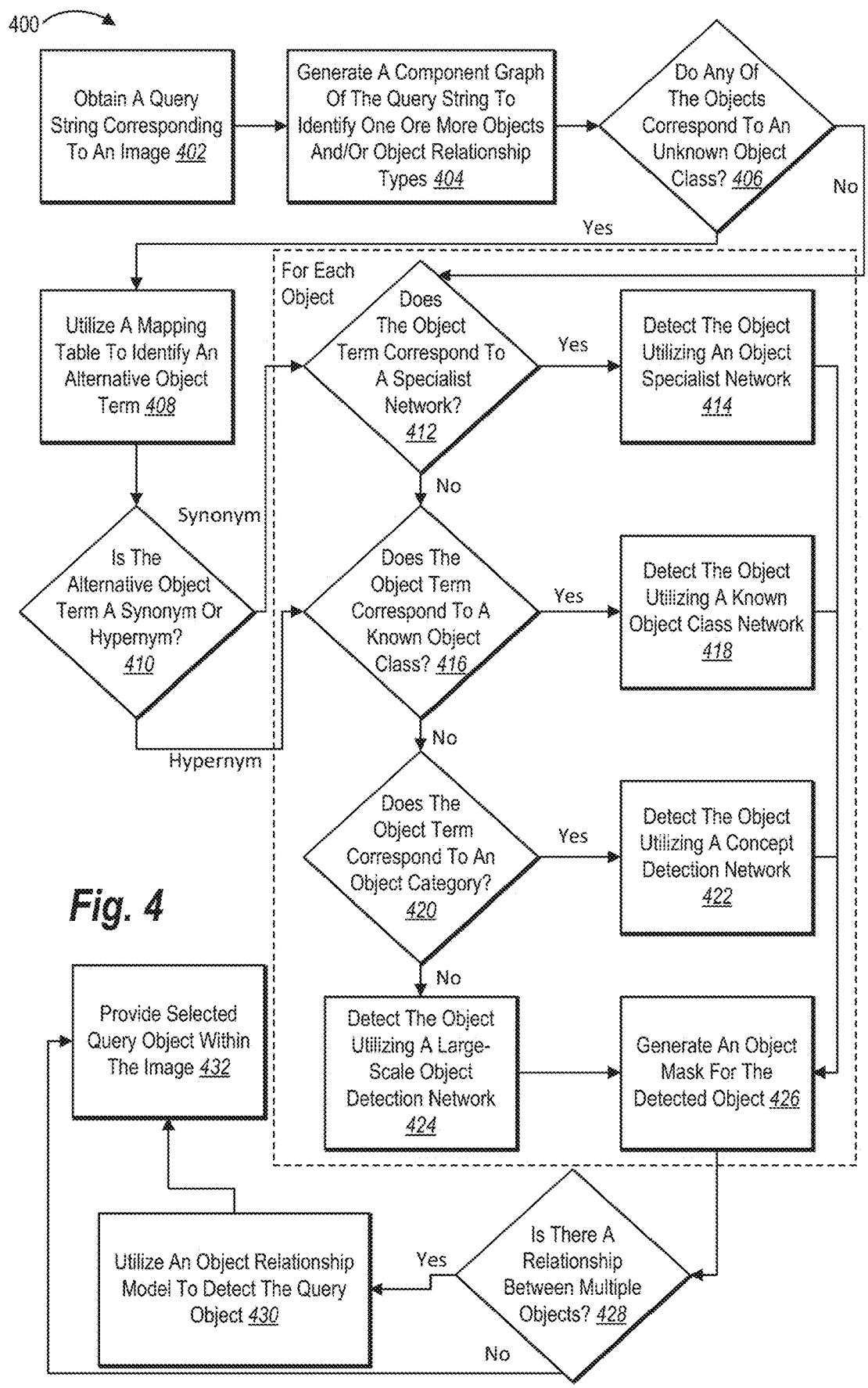
FIG. 4 illustrates a schematic diagram of an object selection pipeline in accordance with one or more implementations.

Turning now to FIGS. 4-12D, additional detail is provided regarding the object selection system 106 generating and utilizing natural language processing tools and the object selection pipeline to automatically select and accurately detect objects requested in an object detection request. In particular, FIG. 4 illustrates an example implementation of the object selection pipeline. FIGS. 5-7D illustrate utilizing mapping tables and alternative object terms to select object detection models within the object selection pipeline. FIGS. 8-12D illustrate utilizing a component graph and object relationship model to identify a query object from among multiple detected objects indicated in the query string.

As mentioned, FIG. 4 illustrates a schematic diagram of an object selection pipeline 400 in accordance with one or more implementations. In various implementations, the object selection system 106 performs actions included in the object selection pipeline 400. In alternative implementations, an image editing system and/or image editing application can perform one or more of the included actions.

As shown, the object selection pipeline 400 includes an act 402 of the object selection system 106 obtaining a query string corresponding to an image (i.e., a digital image). For example, an image into an image editing application, as previously described. In general, the image includes one or more objects. For instance, the image can include background objects (i.e., scenery), foreground objects (i.e., image subjects), and/or other types of objects.

In addition, the act 402 can include the object selection system 106 obtaining a query string. For example, the object selection system 106 provides an object selection interface (e.g., shown in FIG. 3A) where a user can enter one or more words (e.g., user input) indicating the query object that they would like the object selection system to automatically select. As described above, in some implementations, the object selection system 106 can enable alternative forms of user input, such as audio input telling the object selection system 106 to select an object in the image.

Next, the object selection pipeline 400 includes an act 404 of the object selection system 106 generating a component graph of the query string to identify one or more objects and/or relationship types. For example, the object selection system 106 can utilize one or more natural language processing tools, as further detailed below, to generate a component graph. If the query string includes multiple objects, the component graph can also indicate a relationship type between the objects.

As shown, the object selection pipeline 400 includes an act 406 of the object selection system 106 determining whether any of the objects (e.g., object terms) correspond to an unknown object class. In one or more implementations, the object selection system 106 can compare each of the objects to known object classes (e.g., known objects, specialist objects, object categories) to determine whether the object is known or unknown. Indeed, the object selection system 106 can compare an object to a listing or lookup table to determine if an object detection model has been trained to specifically detect the object.

If one of the objects in the query string is determined to not correspond to an unknown object class (e.g., the object is not recognized), the object selection system 106 can proceed to the act 408 in the object selection pipeline 400 of the object selection system 106 utilizing a mapping table to identify an alternative object term. As detailed below in connection with FIGS. 5-7D, the object selection system 106 can often identify a synonym or a hypernym for the unrecognized object term, which the object selection system 106 can utilize in connection with the object selection pipeline 400 to detect the object. In the event that the object selection system 106 cannot identify an alternative object term, the object selection system 106 can jump to the act 424 of the object selection pipeline 400, which is described further below. Moreover, as described below, the object selection system 106 can utilize the mapping table to determine alternative object terms for terms in a query string that are initially unrecognized by the object selection system 106 within the sop 400.

As shown, the object selection pipeline 400 includes an act 410 of the object selection system 106 determining whether the alternative object term is a synonym or a hypernym. If the alternative object term is a synonym, the object selection system 106 can proceed to the act 412 in the object selection pipeline 400, which is described below. Indeed, a synonym of an unrecognized object term often includes at least one alternative object term that is recognized by the object selection system 106 as belonging to a known object class. In this manner, the object selection system 106 treats the synonym alternative object term as if it were the object term (e.g., a replacement object term) for purposes of detecting the object using an object detection model.

If the alternative object term is a hypernym, in one or more implementations, the object selection system 106 can proceed to the act 416 of the object selection pipeline 400, which is described below. Indeed, the object selection system 106 can skip over the act 412 for the sake of efficiency as a hypernym of an unrecognized object would likely not detect the object as the scope of the hypernym is broader than the unknown object. As with synonyms, in general, hypernyms of an unrecognized object term often include at least one alternative object term that is recognized by the object selection system 106. In alternative implementations, the object selection system 106 provides the hypernym of the unrecognized object to the act 412 rather than the act 416.

As shown in FIG. 4, if the object selection system 106 recognizes each of the objects (e.g., the act 406) or recognizes a synonym for any unknown objects (e.g., the act 410), the object selection system 106 can proceed to the act 412. As also shown by the dashed box, the object selection system 106 can iterate through the acts 412-426 of the object selection pipeline 400 for each object included in the query string.

As illustrated, the act 412 of the object selection pipeline 400 includes the object selection system 106 determining whether the object term (e.g., the object term or the alternative object term) corresponds to a specialist network. If a specialty network exists for the query object, the object selection system 106 can identify a particular specialist network based on the query object. For instance, the object selection system 106 can compare the object term to multiple specialist object detection neural networks to identify a specialist object detection neural network that best corresponds to the object. For example, for the object term of "sky," the object selection system 106 can identify that a sky specialist object detection neural network is best suited to identify and select the query object.

As shown in the act 414, the object selection system 106 can detect the object (e.g., based on the object term or alternative object term) utilizing the identified specialized network. More specifically, the object selection system 106 can utilize the identified specialized object detection neural network to locate and detect the object within the image. For instance, the object selection system 106 can utilize the specialized object detection neural network to generate a bounding box around the detected object in the image. In some implementations, if multiple instances of the object are included in the image, the object selection system 106 can utilize the specialized object detection neural network to separately identify each instance of the multiple instances.

In one or more implementations, an object specialist network can include a body parts specialist object detection neural network and/or a clothing specialist detection neural network. Additional detail regarding utilizing specialized object detection neural networks is found in U.S. patent application Ser. No. 16/518,880, "Utilizing Object Attribute Detection Models To Automatically Select Instances Of Detected Objects In Images," filed on Jul. 19, 2019, which is hereby incorporated by reference in its entirety.

As shown, the object selection pipeline 400 includes the act 426, which receives the output from the act 414 along with the output of acts 418, 422, and 424. The act 426 includes the object selection system 106 generating an object mask for the detected object. In some instances, the act 426 includes the object selection system 106 utilizing an object mask neural network. For example, in various implementations, the object selection system 106 can provide a bounding box to an object mask neural network, which generates a mask for the detected query object. If multiple bounding boxes are provided, the object selection system 106 can utilize the object mask neural network to generate multiple object masks from the multiple bounding boxes (e.g., one object mask for each instance of the detected query object).

In generating an object mask for a detected object (or each detected object instance), the object mask neural network can segment the pixels in the detected object from the other pixels in the image. For example, the object mask neural network can create a separate image layer that sets the pixels corresponding to the detected object to positive (e.g., binary 1) while setting the remaining pixels in the image to a neutral or negative (e.g., binary 0). When this object mask layer is combined with the image, only the pixels of the detected object are visible. Indeed, the generated object mask can provide a segmentation that enables the selection of the detected object within the image.

The object mask neural network can correspond to one or more deep neural networks or models that select an object based on bounding box parameters corresponding to the object within an image. For example, in one or more implementations, the object mask neural network utilizes the techniques and approaches found in Ning Xu et al., "Deep GrabCut for Object Selection," published Jul. 14, 2017, the entirety of which is incorporated herein by reference. For example, the object mask neural network can utilize a deep grad cut approach rather than a saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which is incorporated herein by reference in their entirety.

Returning to FIG. 4, if in the act 412, the object selection system 106 determines that the object does not correspond to a specialist network, the object selection system 106 can make an additional determination regarding the object. As shown, the object selection pipeline 400 includes the act 416 of the object selection system 106 determining whether the object term (e.g., the object term or the alternative object term) corresponds to a known object class. For example, in various implementations, the object selection system 106 utilizes an object detection neural network trained to detect objects belonging to a number of known object classes. Accordingly, the object selection system 106 can compare object class of the object (e.g., based on the object term or an alternative object term) to the known object classes to determine if the object is part of the known object classes. If so, the object selection system 106 can proceed to the act 418 of the object selection pipeline 400. Otherwise, the object selection system 106 can proceed to the act 420 of the object selection pipeline 400, described further below.

As just mentioned, the object selection pipeline 400 includes the act 418 of the object selection system 106 detecting the object utilizing a known object class network. Known object classes can include object classes tagged in training images and used to train an object detection neural network. Accordingly, based on detecting that the object is associated with a known object class, the object selection system 106 can utilize a known object class detection neural network to optimally detect the object with respect to accuracy and efficiency. Further, the object selection system 106 can provide the detected object to the object mask neural network to generate an object mask (e.g., the act 426), as described above. Additional detail regarding the act 418 is provided with respect to U.S. patent application Ser. No. 16/518,880, "Utilizing Object Attribute Detection Models To Automatically Select Instances Of Detected Objects In Images," filed on Jul. 19, 2019, which is hereby incorporated by reference in its entirety.

If the object selection system 106 determines that the object does not correspond to a specialist network (e.g., the act 412) or a known object class (e.g., the act 416), the object selection system 106 can make an additional determination. To illustrate, the object selection pipeline 400 includes the act 420 of the object selection system 106 determining whether the object term (e.g., object term or an alternative object term) corresponds to an object category (e.g., uncountable objects such as water, a road, and a ceiling). If the object term corresponds to an object category, the object selection system 106 determines to utilize concept-based object detection techniques to detect the object, as described below.

To illustrate, the object selection pipeline 400 includes an act 422 of the object selection system 106 detecting the object utilizing a concept detection network (i.e., a concept-based object detection neural network and/or panoptic semantic segmentation neural network). In general, a concept detection network can include an object detection neural network trained to detect objects based on concepts, background scenery, and other high-level descriptions of objects (e.g., semantics). Additional detail regarding the act 418 is provided with respect to U.S. patent application Ser. No. 16/518,880, "Utilizing Object Attribute Detection Models To Automatically Select Instances Of Detected Objects In Images," filed on Jul. 19, 2019, which is hereby incorporated by reference in its entirety.

As shown in FIG. 4, the object selection system 106 provides the object detected by the concept detection network to the object mask neural network to generate an object mask of the detected object (i.e., the act 426). For example, the object selection system 106 provides the detected sematic area of an object concept within the image. As mentioned above, the object mask neural network can generate a segmentation of the detected object, which the object selection system 106 utilizes as a selection of the detected object.

Up to this point in the object selection pipeline 400, the object selection system 106 has been able to detect objects corresponding to known object classes. Indeed, utilizing the object term or an alternative object term, the object selection system 106 has been able to map the object term to an object detection model trained to detect the object term. However, while the list of known object classes often numbers in the tens of thousands, in some instances, the object selection system 106 does not recognize an object. Nevertheless, the object selection system 106 can further extend object recognition capabilities by detecting objects of unknown categories. In this manner, the object selection system 106 can add additional layers to the object selection pipeline 400 to facilitate the detection of unknown objects.

To illustrate, if the object selection system 106 determines in the act 420 that the object is not part of an object category, the object selection system 106 can detect the object using a large-scale object detection network, as shown in the act 424 of the object selection pipeline. In one or more implementations, the large-scale object detection network includes utilizing a concept mask model and/or an automatic tagging model.

As mentioned above, the object selection pipeline 400 can include various object detection model. For example, in one or more implementations, the object selection pipeline 400 includes a panoptic segmentation detection model. In one or more implementations, a panoptic segmentation detection model detects instances of objects utilizing a segmentation-based approached. Indeed, the object selection system 106 can utilize additional (or fewer) object detection models, which can easily be inserted into (or removed from) the object selection pipeline 400.

As shown in FIG. 4, the object selection pipeline 400 can include an act 428 of the object selection system 106 determining whether there is a relationship between multiple objects. To illustrate, if the query string only includes a single object (i.e., the query object) the object selection system 106 can skip to the act 432 of providing the selected query object within the image. Otherwise, if the query string includes multiple objects, for which the object selection system 106 generated multiple object masks, the object selection system 106 can identify a query object from among the multiple detected objects.

More specifically, in various implementations, the object selection system 106 can determine the relationship type between the detected objects. For example, the object selection system 106 analyzes the component graph (e.g., generated in act 404) to identify the relationship type. Based on the relationship type, the object selection system 106 can isolate the query object from the multiple detected objects.

To illustrate, the object selection pipeline 400 includes an act 430 of the object selection system 106 utilizing an object relationship model to detect the query object. In particular, the object selection system 106 selects an object relationship model trained based on, in part, objects having the given relationship type indicated in the component graph. Next, the object selection system 106 can isolate the query object from among the multiple objects based on finding the object that satisfies the object relationship model. Additional detail regarding identifying a query object based on a corresponding object relationship model is provided below in connection with FIGS. 8-12D.

As shown in the act 432 of the object selection pipeline 400, once the object selection system 106 isolates an object mask of the query object, the object selection system 106 provides the query object within the image. For instance, the object selection system 106 can provide the selected object (or selected instance of the object) to a client device associated with a user. For example, the object selection system 106 can automatically select the object within the image for the user within the image editing application mentioned above.

FIG. 4 and the identified corresponding figures describe various implementations of selecting objects in an image. Accordingly, the actions and algorithms described in connection with FIG. 4 and subsequently identified figures (e.g., FIGS. 5-12D) provide example structure and architecture for performing a step for detecting an object utilizing natural language processing tools and an object detection neural network selected from a plurality of object detection neural networks. Indeed, the flow charts described in connection with FIGS. 4, 5, and 8 provides structure for one or more of the algorithms corresponding to the object selection system 106.

As described above, the object selection pipeline 400 includes various components that the object selection system 106 utilizes to detect a query object. Additionally, many of the components are interchangeable with updated versions as well as new components. Accordingly, when faults occur, the object selection system 106 can identify and update the source of the fault. In addition, the object selection system 106 can also add further components to the object selection pipeline to improve the performance of the detected objects in images. Additional detail regarding modifying and updating the object selection pipeline 400 with interchangeable modules is found in U.S. patent application Ser. No. 16/518, 880, "Utilizing Object Attribute Detection Models To Automatically Select Instances Of Detected Objects In Images," filed on Jul. 19, 2019, which is hereby incorporated by reference in its entirety.

Figure 5:
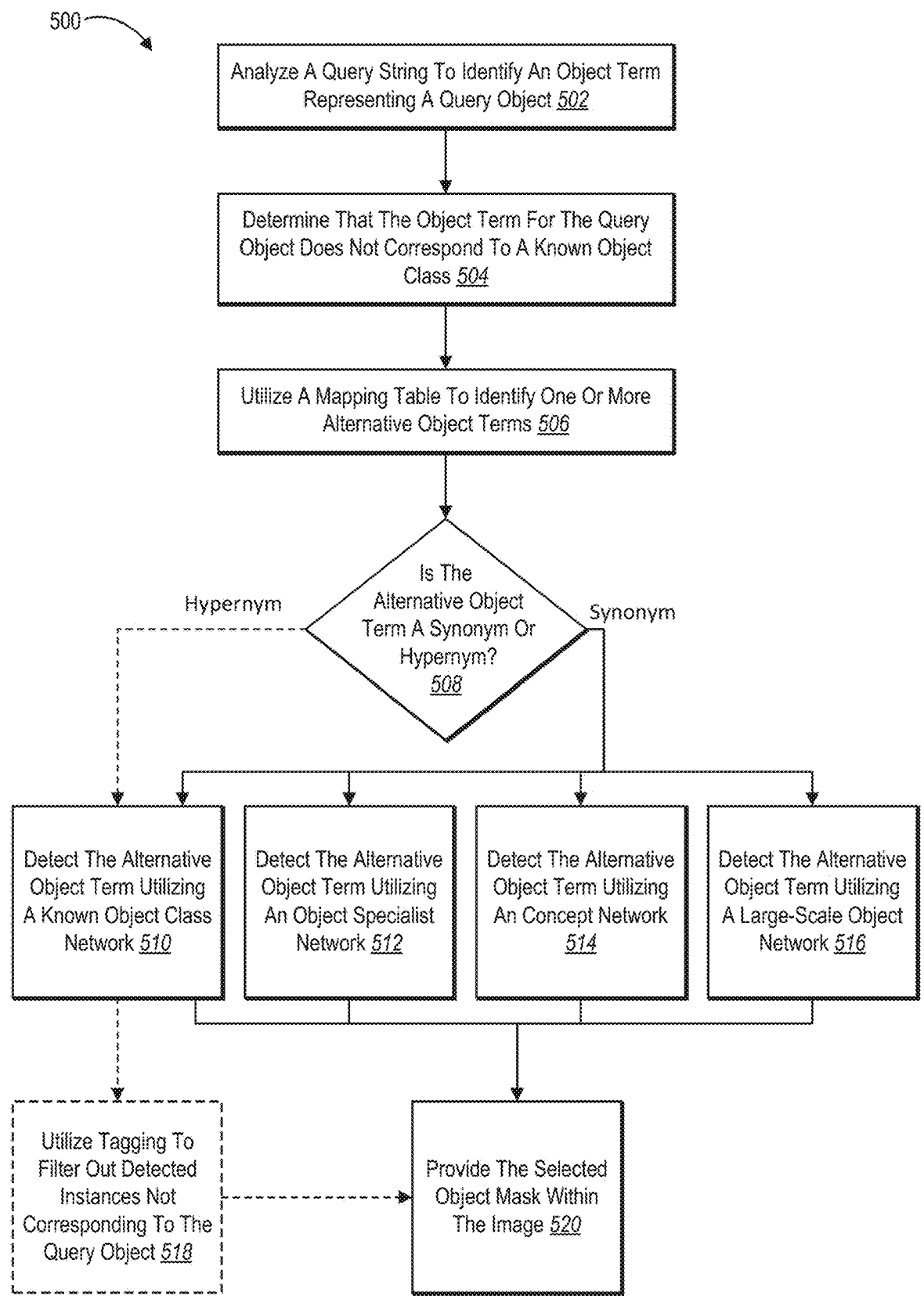
FIG. 5 illustrates a flow chart of identifying and selecting a query object based on an alternative object term in accordance with one or more implementations.

Turning now to the next figure, FIG. 5 illustrates a flow chart of a series of acts 500 of identifying and selecting a query object based on an alternative object term in accordance with one or more implementations. As mentioned above, FIG. 5 provides additional detail with respect to the acts 408-410 of the object selection pipeline 400 described above in connection with FIG. 4. Indeed, the series of acts 500 in FIG. 5 shows how the object selection system 106 can modify the object selection pipeline based on a mapping table.

For simplicity, the series of acts is described with respect to a query string that includes a single object to be selected (i.e., the query object). However, as shown above in connection with the object selection pipeline, the query string can include multiple objects that the object selection system 106 detects using one or more object detection models and, from which, the object selection system 106 can isolate a query object utilizing an object relationship model.

As shown, the series of acts 500 includes the act 502 of the object selection system 106 analyzing a query string to identify an object term representing a query object. As mentioned above, the object selection system 106 can identify an object in the query string in a variety of ways. For example, the object selection system 106 parses the query string to determine nouns in the query string. In other implementations, the object selection system 106 generates a component graph that indicates the objects within the query string.

In addition, the series of acts 500 includes an act 504 of the object selection system 106 determining that the object term of the query object does not correspond to a known object class. For example, as mentioned above, the object selection system 106 can search a list or database of known objects and/or known object classes for the object term. If the object selection system 106 does not recognize the object term, the object selection system 106 can determine that the object term corresponds to an unknown object class.

Further, the series of acts 500 includes the act 506 of the object selection system 106 utilizing a mapping table to identify one or more alternative object terms. For example, the object selection system 106 accesses one or more mapping tables to identify synonyms, hypernyms, hyponyms, or other alternative object terms for the unrecognized object term. As described above, synonyms include terms that are interchangeable with the unknown object term. Hypernyms include terms that are broader than an unknown object term. Hyponyms include terms that are narrower than an unknown object term (e.g., sub-categories of the unknown object term). Examples of a synonym mapping table and a hypernym mapping table are provided below in connection with FIGS. 6A and 6B.

In many implementations, the alternative object terms for an unknown object term correspond to known object terms. For example, in one or more implementations, the mapping table only includes alternative object terms that are known object terms. In alternative implementations, the mapping table can also include one or more alternative object terms for an unknown object term that are themselves unknown object terms. In these latter implementations, the object selection system 106 can choose not to select the alternative object term and search for further or different alternative object terms.

As shown, the series of acts 500 includes an act 508 of the object selection system 106 determining whether the alternative object term is a synonym or a hypernym. If the alternative object term for the query object is a synonym, the object selection system 106 can utilize the object selection pipeline as provided above in connection with FIG. 4. For example, the object selection system 106 replaces the unknown object term with the known alternative object term, then identifies and utilizes the object detection model in the object selection pipeline that most accurately and efficiently detects the alternative object term.

To illustrate, FIG. 5 shows that the act 508 can proceed to multiple acts when the alternative object term is a synonym or a high-confidence match. For example, as shown in the act 510, if the object selection system 106 determines that the synonym alternative object term is a known object, the object selection system 106 detects the alternative object term utilizing a known object class network, which is described above with respect to the act 418 in FIG. 4. As shown in the act 512, if the object selection system 106 determines that the synonym alternative object term is a specialist object, the object selection system 106 detects the alternative object term utilizing an object specialist network, which is described above with respect to the act 414 in FIG. 4.

In addition, as shown in the act 514 if the object selection system 106 determines that the synonym alternative object term is a known object concept or category, the object selection system 106 detects the alternative object term utilizing a concept detection network, which is described above with respect to the act 422 in FIG. 4. Further, as shown in the act 516, if the object selection system 106 does not recognize the synonym alternative object term, the object selection system 106 can detect the alternative object term utilizing a large-scale object detection network, which is described above with respect to the act 424 in FIG. 4.

As described above, each of the selected object detection networks can detect the alternative object term. In additional implementations, the selected object detection network can generate one or more object masks for one or more instances of the detected object. In alternative implementations, the object selection system 106 utilizes an object mask neural network to generate one or more object masks of the query object.

Returning to the act 508 in the series of acts 500, if the alternative object term is a hypernym or a low-confidence match, the object selection system 106 can modify the object selection pipeline. To illustrate, if the alternative object term is a hypernym, the object selection system 106 can restrict the available acts from the series of acts to the act 510 of detecting the alternative object term utilizing a known object class network. Indeed, in various implementations, the object selection system 106 can exclude the option of proceeding to the acts 512-516 if the alternative object term is a hypernym. In alternative implementations, the object selection system 106 can provide the hypernym to any of the acts 512-516.

To further elaborate, the act 510 can process both high-confidence matches (i.e., synonyms) as well as low-confidence matches (i.e., hypernym). Indeed, high-confidence alternative object term matches do not require additional object verification by the object selection system 106 to ensure that the query object is the object detected by the known object class network. However, if the alternative object term is a hypernym, the object selection system 106 can perform one or more additional acts to verify if the detected objects correctly include the query object indicated in the query string.

For example, when the alternative object term is a hypernym, as illustrated in FIG. 5 by the dashed arrows, the series of acts 500 can include an act 518 of the object selection system 106 utilizing tagging to filter out detected instances not corresponding to the query object. For instance, in one or more implementations, the object selection system 106 utilizes an auto tagging model to label each of the detected objects, then, the object selection system 106 unselects instances of the query object that do not match with the query object. In alternative implementations, the object selection system 106 utilizes another tagging approach to tag and unselect detected instances of the query object that are distinct from the query object.

To illustrate, if the query string includes the words, "the badminton player," the object selection system 106 may find a hypernym alternative object term of "person," "man," and "woman," which are hypernyms of the object term "badminton player." In response, the known object class may identify multiple persons in an image. However, because a "person" is a much broader term than the query object term of "badminton player," the known object class may identify more persons in an image than just the badminton player. Accordingly, the object selection system 106 can utilize an auto tagging model to verify of the masks and/or bounding boxes of each detected person in the image correctly includes the badminton player or another type of person.

As mentioned above, the object selection system 106 largely does not utilize other object detection models (i.e., the acts 512-516) to detect a hypernym alternative object term for a query object. To elaborate, because hypernyms have a broad object scope, most specialist object detection models are incompatible as they correspond to specific objects and object classes. Likewise, most concept detecting networks are trained to detect particular object categories. With respect to the large-scale object detection network, because the object selection system 106 utilizes an auto tagging model as part of filtering out non-query object selections, the object selection system 106 is unable to use the auto tagging model as an additional verification/filtering step.

In one or more implementations, the object selection system 106 identifies a hyponym or sub-grouping for a query object having an unknown object class. In many implementations, the object selection system 106 treats hyponyms as it does synonym alternative object terms. However, because a hyponym can include sub-categories of a query object, the object selection system 106 can perform multiple iterations of the series of acts 500 to detect each instance of the query object. For example, if the query object is "furniture," hyponyms can include the sub-category objects of "table," "chair," "lamp," and "desk." Accordingly, the object selection system 106 can repeat the acts 510-516 for each sub-category instance of the query object.

As shown in FIG. 5, the series of acts can include an act 520 of the object selection system 106 providing the selected object mask within the image. As described above, the object selection system 106 can provide an image with the query object automatically selected in response to the query string. Thus, even if the query object in the query string did not initially correspond to a known object class, the object selection system 106 can use a mapping table and one or more alternative object terms to more accurately and efficiently detect it. Indeed, by pushing object detection of unknown objects in a query string to targeted object detection models, such as the specialist object detection model and the known object class detection model, rather than default to using the large-scale object detection model, the object selection system 106 can drastically improve performance of the object selection system 106 with respect to accuracy and efficiency.

While FIG. 5 relates to utilizing a mapping table to determine alternative object terms for nouns in a query string, the object selection system 106 can utilize one or more mapping tables at various stages of the object selection pipeline. For example, if the object selection system 106 determines that a term (e.g., an attribute) in the query string is incongruent with one or more models in the object selection pipeline, the object selection system 106 can utilize the mapping table to identify alternative object term (e.g., synonyms) that are recognized by the object selection system 106. As another example, the object selection system 106 utilizes a mapping table to determine alternative terms for tags generated for a potential object. In this manner, the object selection system 106 can utilize intelligent matching to verify that terms in a user's query match objects classes and models utilized by the object selection system 106.

Turning to FIGS. 6A-6B, examples of mapping tables are illustrated. In particular, FIGS. 6A-6B illustrate multiple mapping tables utilized to identify alternative mapping terms of a query object in accordance with one or more implementations. For example, FIG. 6A shows a synonym mapping table 610 that includes a first column of object terms (i.e., nouns) and a second column of corresponding synonyms. In a similar manner, FIG. 6B shows a hypernym mapping table 620 that includes a first column of object terms (i.e., nouns) and a second column of corresponding hypernyms.

In the synonym mapping table 610, the object selection system 106 can look up an object term for an unrecognized query object (e.g., a query object with an object term that does not correspond to a known object class) and identify one or more synonyms corresponding to the object term. To illustrate, for the object term of "lady," the object selection system 106 can identify the synonym alternative object term of "woman."

As mentioned above, in various implementations, each of the synonyms listed in the synonym mapping table 610 can correspond to a known object class. For instance, in one or more implementations, each object term in the synonym mapping table 610 maps to at least one synonym that corresponds to a known object class. In some implementations, the synonym mapping table 610 only includes alternative object terms that correspond to known object classes. In alternative implementations, the synonym mapping table 610 can include additional alternative object terms, such as object terms that do not correspond to known object classes.

In some implementations, the synonyms are ordered based on detectability. As one example, the first listed synonym corresponds to an object detectable by a specialist object detection network and the second listed synonym corresponds to an object detectable by the known object class network. In another example, the first listed synonym corresponds to an object detectable by the known object class network while the next listed synonyms correspond to less-efficient and effective object detection models (e.g., the large-scale object detection model).

As mentioned above, FIG. 6B shows the hypernym mapping table 620, which is similar to the synonym mapping table 610 of FIG. 6A. As shown, the hypernym mapping table 620 includes hypernyms that map to the object terms. To illustrate, for the object term of "dog," the hypernym mapping table 620 maps to the hypernyms of "pet," "animal," and "mammal."

In various implementations, the object selection system 106 generates a combined mapping table that includes an object term mapping for both synonyms and hypernyms. In some implementations, the mapping table can include hyponyms. Further, in one or more implementations, the can determine hyponyms by reverse looking up object terms in the second hypernym column and identify hyponyms from the first object term column. For example, for the object term of "human," the object selection system 106 can find the hyponyms of "lady," and "dude" among other alternative object terms.

In addition, the object selection system 106 can modify the mapping table or tables. For example, as new slang terms or finely-granular terms are identified, the object selection system 106 can add entries for these terms to the mapping table. In some implementations, the object selection system 106 pulls new terms from an external source, such as an online dictionary database or a crowdsourced website.

Figure 7A:
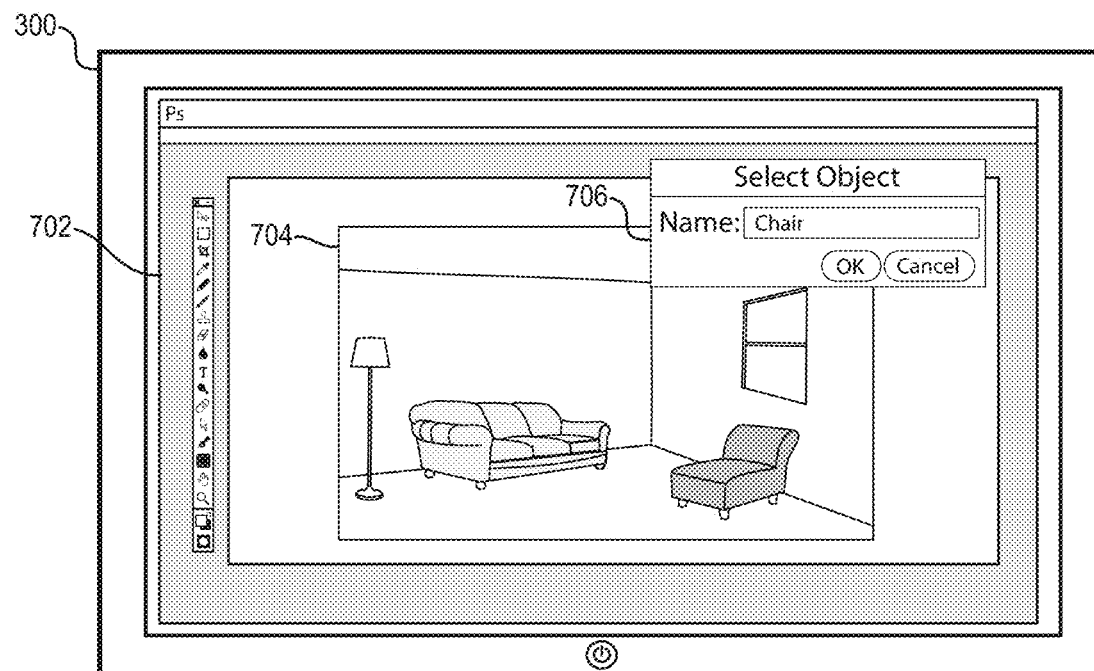
FIGS. 7A-7D illustrate a graphical user interface showing a process of selecting a query object based on one or more alternative terms in accordance with one or more implementations.

FIGS. 7A-7D illustrate a graphical user interface 702 of selecting a query object based on one or more alternative terms in accordance with one or more implementations. For ease in explanation, FIGS. 7A-7D include the client device 300 introduced above. For example, the client device 300 includes an image editing application and the object selection system 106 within a graphical user interface 702. Indeed, as shown in FIG. 7A, the graphical user interface 702 includes an image 704 of a room with various pieces of furniture. In addition, the graphical user interface 702 includes an object selection interface 706, as described above in connection with FIG. 3A, where the user provides the query string of "chair."

Upon detecting the user requesting automatic selection of the chair from the image 704 based on the query string, the object selection system 106 can utilize natural language processing tools and the object selection pipeline 400 to determine how to optimally fulfill the request. For example, the object selection system 106 can determine that the query object in the query string is "chair." Further, the object selection system 106 can determine that the object term of "chair" does not correspond to a known object class.

Based on the determination that the query object does not correspond to a known object class, the object selection system 106 can access a mapping table to identify an alternative object term for the query object. In this example, the object selection system 106 is unable to identify a synonym for the query object. However, the object selection system 106 identifies the hypernym of "furniture."

Figure 7B:
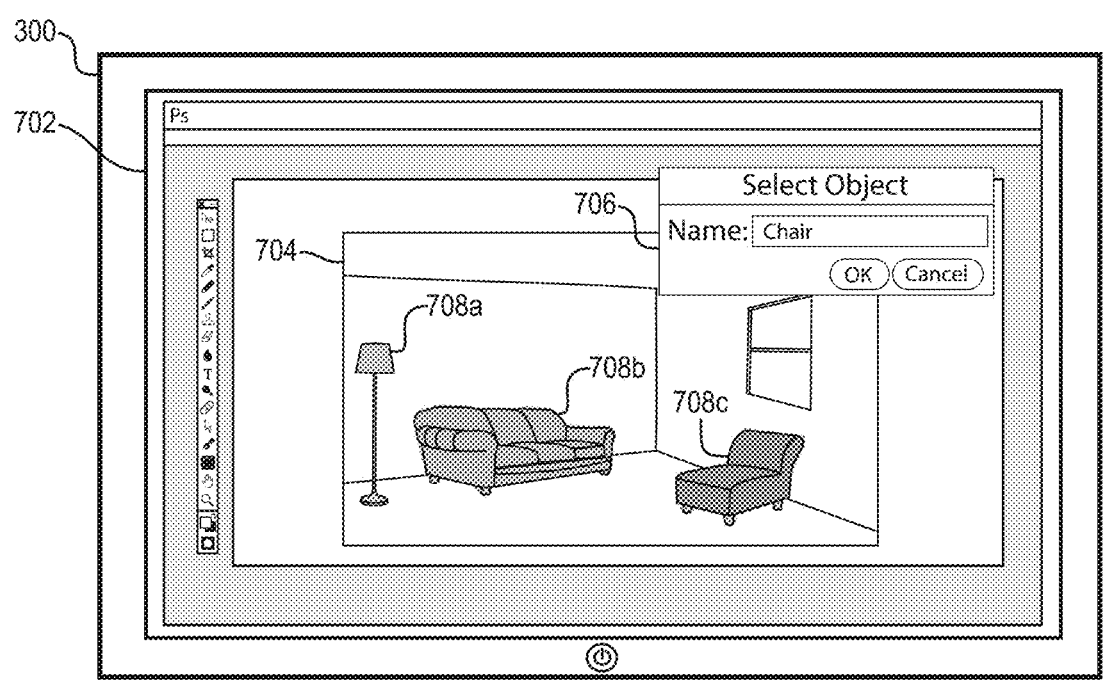
Figure 8:
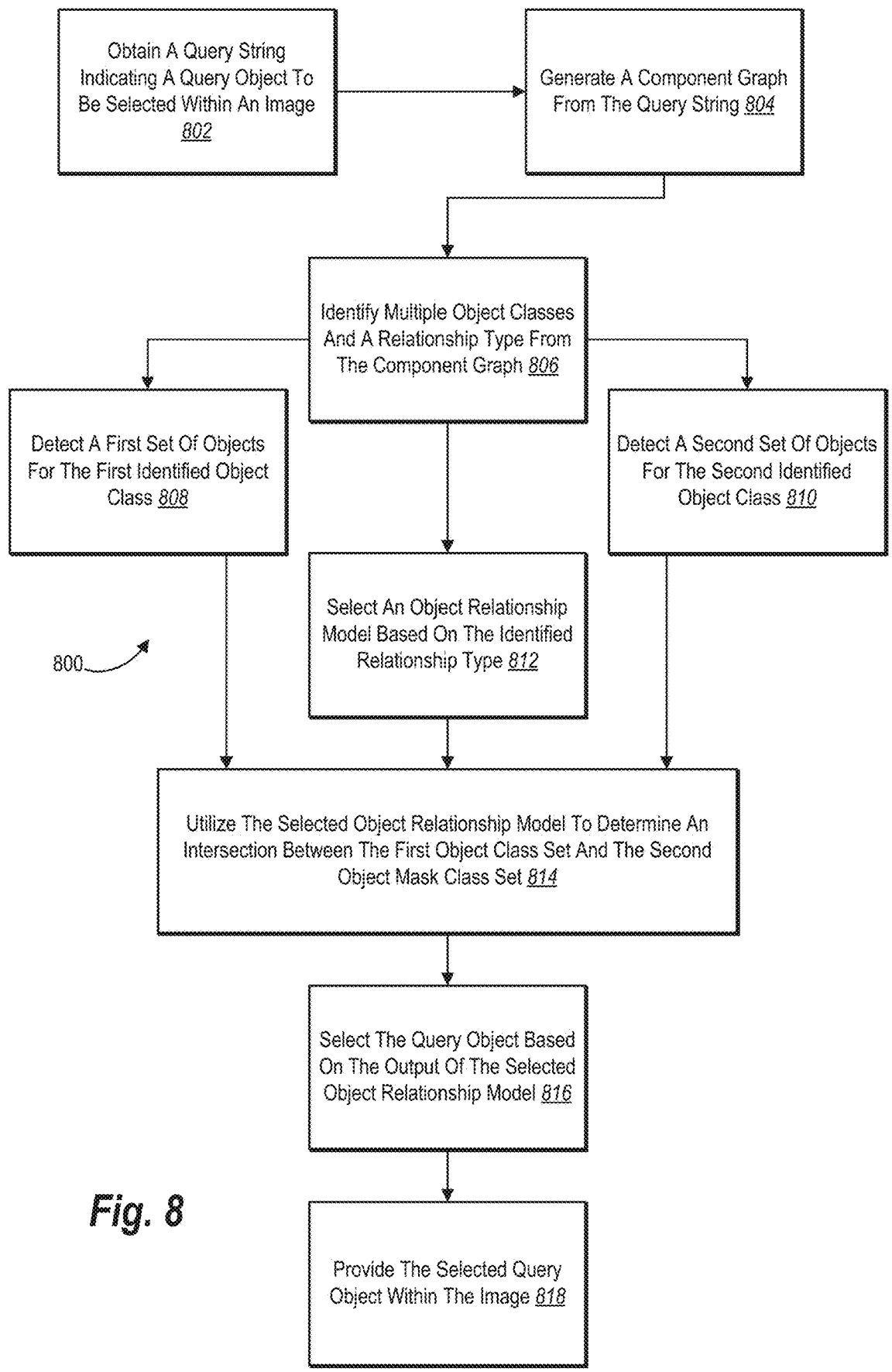
FIG. 8 illustrates a flow chart of utilizing an object relationship model to detect a query object from among multiple objects associated with natural language user input in accordance with one or more implementations.

Utilizing the hypernym alternative object term (i.e., "furniture"), the object selection system 106 can utilize the known object class network to identify each instance of furniture in the image. To illustrate, FIG. 7B shows the object selection system 106 generating an object mask for the lamp 708a, the sofa 708b, and the chair 708c, as each of these items fall under the hypernym of furniture.

As mentioned above, the object selection system 106 can modify the object selection pipeline described above to add a verification step when a hypernym is used as an alternative object term. To illustrate, FIG. 7C shows the object selection system 106 utilizing an auto tagging model to generate labels for each of the detected instances of the query object.

Figure 7C:
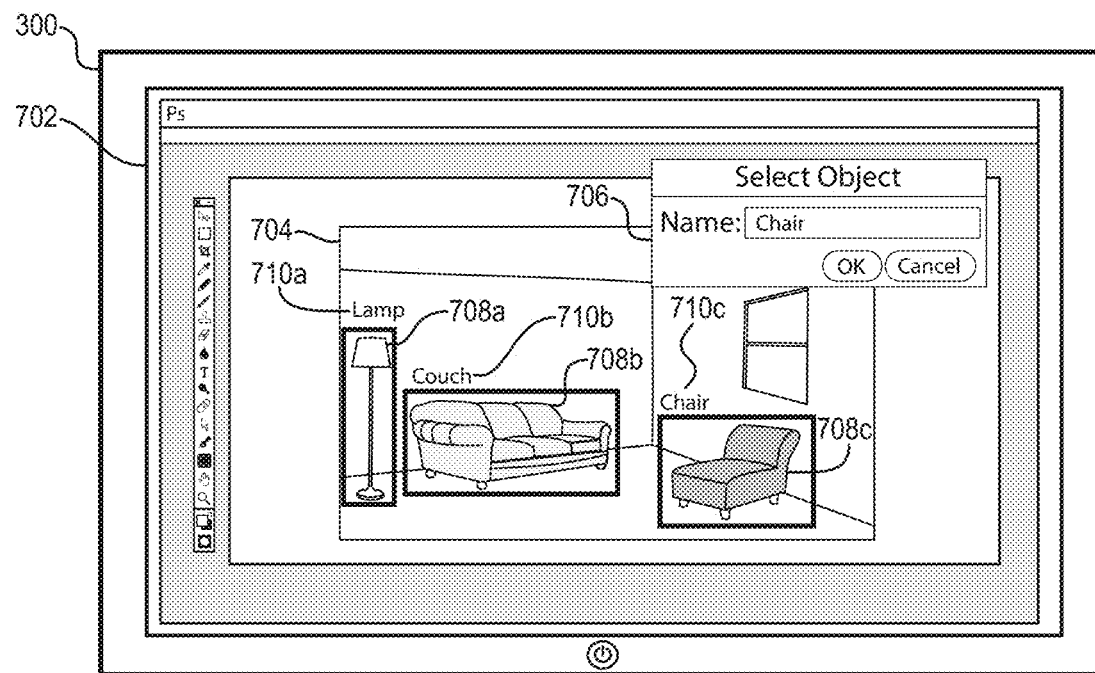

In particular, the image 704 in FIG. 7C shows a lamp label 710a, a couch label 710b, and a chair label 710c in connection with the corresponding detected furniture.

In one or more implementations, the object selection system 106 utilizes the labels or tags to select the query object. For example, in some implementations, the object selection system 106 compares the unrecognized query object term to each of the labels to determine which label has the strongest correspondence to the query object (e.g., a correspondence score above a correspondence threshold). In various implementations, the object selection system 106 does not find a strong correspondence between the unrecognized query object term (i.e., "chair") and the labels. However, for another detected object in the image (i.e., the lamp) the object selection system 106 determines a weak correspondence score for the label of "chair" and a much stronger correspondence score for the label of "lamp." According, based on the correspondence score for the label of lamp being stronger than the correspondence score for the label of chair, the object selection system 106 can deselect the lamp within the image.

In many implementations, the object selection system 106 can generate multiple labels for each of the detected instances of the query object. Further, the object selection system 106 can associate a confidence score with each generated label. In this manner, the object selection system 106 can utilize a label's confidence score as a weight when determining a correspondence score between the label and the detected query object instance or when comparing labels to determine to which object an unrecognized object corresponds.

Figure 7D:
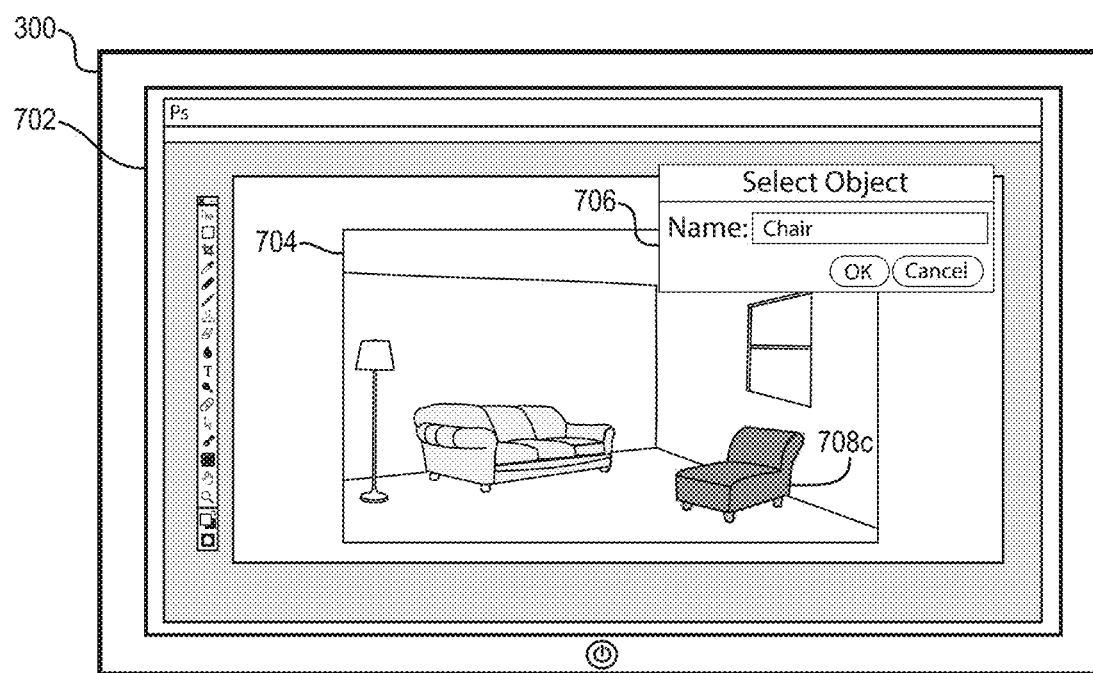

As shown in FIG. 7D, the object selection system 106 can select the chair 708c as the query object and provide within the image 704 in response to the query string. In some implementations, the object selection system 106 may provide multiple selected objects within the image 704 if the object selection system 106 is unable to deselect detected instances due to a lack of confidence. For example, if the object selection system 106 is unable to identify and tag the detected instances of "furniture," the object selection system 106 provides all three objects selected to the user within the image 704. In this manner, the image editing application can allow a user to manually deselect objects that are not the query object, which is a simple task compared to manually selecting an object.

Turning to FIG. 8, a flow chart of a series of acts 800 for utilizing an object relationship model to detect a query object from among multiple objects associated with natural language user input is illustrated in accordance with one or more implementations. Indeed, the series of acts 800 can include the object selection system 106 utilizing a computation graph, which provides the structure of a natural language input (e.g., a query string) to implement handling of selection requests that specify an object or area (e.g., an object class) using relationships between objects or object parts. As mentioned above, FIG. 8 provides additional detail with respect to the act 404 and the act 430 of the object selection pipeline 400 described above in connection with FIG. 4.

As shown, the series of acts 800 includes an act 802 of the object selection system 106 obtaining a query string indicating a query object to be selected within an image. In one or more implementations, the query string includes multiple objects, such as the query string of "woman in the dress." In these implementations, detecting and selecting the query object is predicated based on another object included in the query string. Further, the first noun (i.e., "woman") is commonly the query object while the second noun (i.e., "dress") is a secondary object used to identify the query object from among multiple instances of the first noun in an image.

Figure 9A:
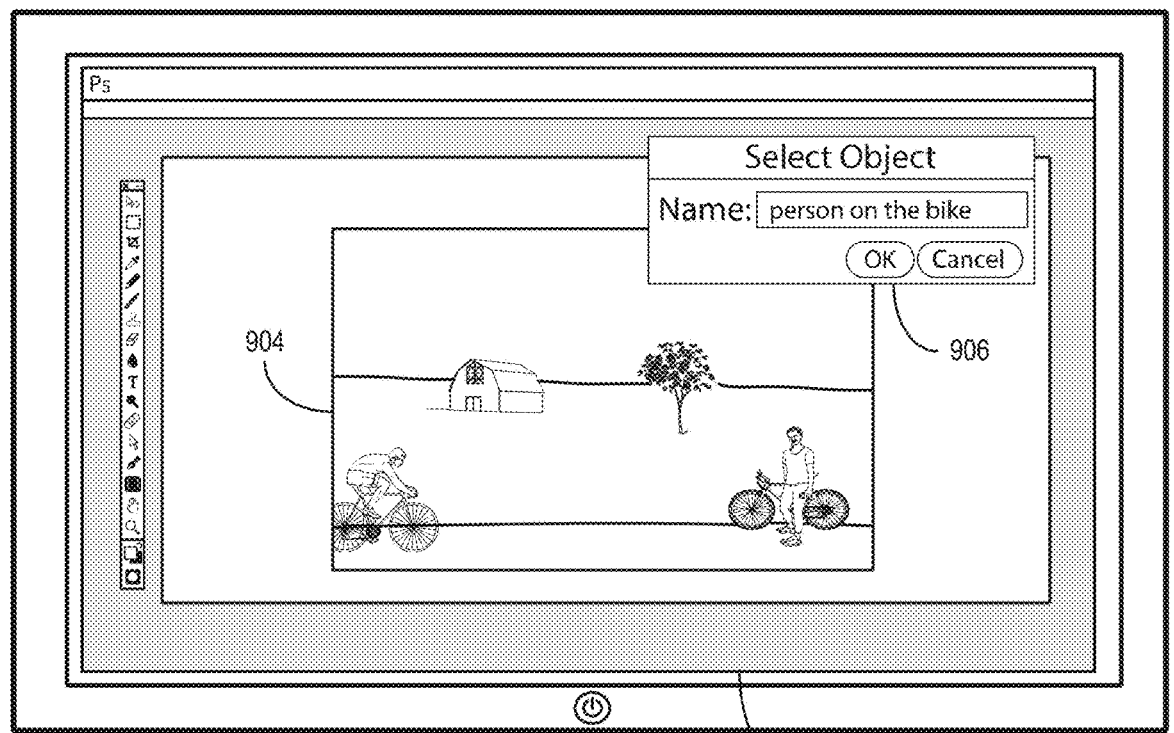
FIG. 9A illustrates a graphical user interface of a digital image that includes a natural language object selection query in accordance with one or more implementations.
Figure 9B:
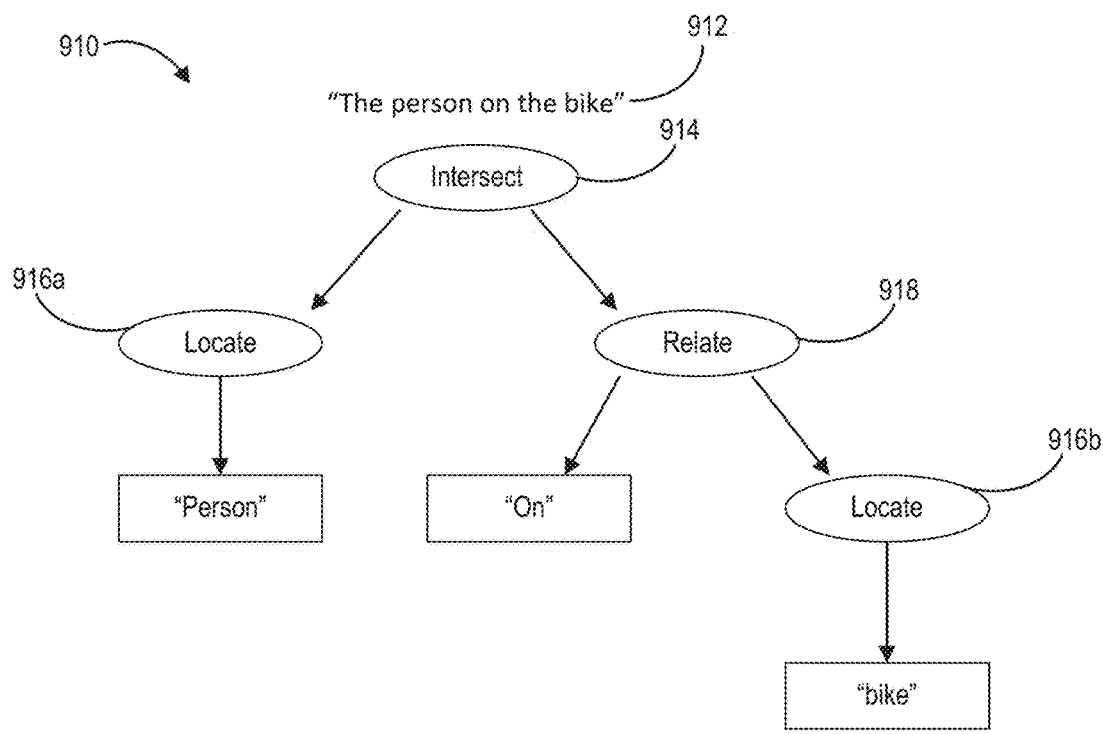
FIG. 9B illustrates a component graph of the natural language object selection query shown in FIG. 9A.

In addition, the series of acts 800 includes an act 804 of the object selection system 106 generating a component graph from the query string. As described above, a component graph identifies each of the objects identified in the query string as well as a relationship type between objects when multiple objects are present. In one or more implementations, the component graph is structured as a tree. In alternative implementations, the component graph is structured in a table, listing, or database format. FIGS. 9A-9B below provide a visual example of a component graph based on a query string as well as provide further detail with respect to generating a component graph.

As shown, the series of acts 800 includes an act 806 of the object selection system 106 identifying multiple object classes and a relationship from the component graph. For example, the object selection system 106 analyzes the component graph to identify each of the objects included in the query string. In many implementations, one or more of the objects will have an object class corresponding to a class of known objects. To illustrate, for the query string of "woman in the dress," the object selection system 106 generates a component graph that identifies the objects of woman and dress. In some implementations, at least one of the objects in the query string has an object class corresponding to an object category (e.g., "sky," "water," or "background").

As mentioned above, in various implementations, the object selection system 106 can identify the relationship between objects from the component graph. For example, based on analyzing the component graph, the object selection system 106 identifies what relationship exists between two or more objects. To illustrate, for the query string of "woman in the dress," the object selection system 106 generates a component graph that identifies the relationship term of "in" within the query string.

In one or more implementations, the relationship between two objects is indicated by a preposition, such as the terms of "in," "with," "of," "on," "above," and "at." In some implementations, the relationship between two objects is indicated by a verb (e.g., an action), such as the terms of "holding," "wearing," "catching," "jumping," "driving," and "touching." In additional implementations, the relationship between two objects is indicated by a phrase, such as "on the top of," "in the background," and "next to."

In one or more implementations, the object selection system 106 utilizes a lookup table, listing, database to map relationship terms in the component graph to relationship types. For example, the object selection system 106 can determine that the terms of "on" and "wearing" correspond to a first relationship type, the terms of "behind" and "on the top of" correspond to a second relationship type, and the terms of "in the background" and "in the foreground" correspond to a third relationship type. In alternative implementations, the object selection system 106 determines relationship types for the component graph by using a machine-learning model that analyzes the query string and the component graph, and predicts the relationship type.

As shown, the series of acts 800 includes an act 808 of the object selection system 106 detecting a first set of objects for the first identified object class. For instance, the image may include one or more instances of the first identified object class. To illustrate, for the first object of "woman" in the query string "woman in the dress," the object selection system 106 detects each instance of a woman detected in the image. As mentioned above, when a query string includes multiple objects, often, the first identified object in the query string includes the query object and the user is requesting that the object selection system 106 automatically select a particular instance of the first object as the query object based on its relationship to another object (e.g., a secondary object included in the query string). Otherwise, if the image has only one instance of the query object, the query string need only include the query object without referencing additional relative objects.

In various implementations, the object selection system 106 utilizes the object selection pipeline, as described above, to select the optimal object detection model for the first object class for detecting each instance of the first object class. For instance, if the first object class corresponds to a specialist object class, the object selection system 106 detects each instance of the first object class utilizing a specialist object detection network targeted toward detecting the object class. Likewise, if the first object class corresponds to a known object class, the object selection system 106 detects each instance of the first object class utilizing the known object class network.

In one or more implementations, the object selection system 106 generates an object mask for each detected instance of the first object class. In alternative implementations, the object selection system 106 generates a bounding box for each detected instance of the first object class without generating object masks. In these implementations, the object selection system 106 can generate the object mask after it has isolated one or more particular instances on the query object. In this manner, the object selection system 106 can reduce computations by not generating object masks for instances of an object not requested for selection by the user.

As shown, the series of acts 800 includes an act 810 of the object selection system 106 detecting a second set of objects for the second identified object class. As with the first object class, the object selection system 106 can utilize the object selection pipeline to detect one or more instances of the second object class. To illustrate, for the second object class of "dress" in the query string "woman in the dress," the object selection system 106 generates an object mask for each dress detected in the image. Again, as described above, in some implementations, the object selection system 106 can generate a bounding box and/or an object mask for each detected instance of the second object class (i.e., dress).

As shown, the series of acts 800 includes an act 812 of the object selection system 106 selecting an object relationship model based on the identified relationship type. In one or more implementations, the object selection system 106 selects an object relationship model from a group of object relationship models based on the identified relationship type. In some implementations, the object selection system 106 utilizes a conical list of relationship operators (i.e., object relationship models) that map relationship-based words and phrases (e.g., relationship types) in a query string to a particular object relationship model. Indeed, based on each relationship type indicating a pairwise relationship between objects, the object selection system 106 identifies a corresponding object relationship model (e.g., a pairwise relationship operator) tailored to the pairwise relationship (e.g., relationship type). Examples and additional disclosure of object relationship models are provided below in connection with FIG. 10.

In addition, the series of acts 800 includes an act 814 of the object selection system 106 utilizing the select object relationship model to determine an intersection between the first object class set and the second object class set. For instance, the object selection system 106 determines an intersection between the first set of detected objects and the second set of detected objects that satisfy the relationship constraints of the selected object relationship model. Indeed, the object selection system 106 can determine whether one or more detected instances of the first object class satisfies a relationship threshold with one or more detected instances of the second object class, as specified by the selected object relationship model.

In various implementations, the object selection system 106 tests each instance of the first detected object set with each instance the second detected object set to determine if any pairs satisfy the selected object relationship model. To illustrate, for the query string of "woman in the dress" and an object relationship model that determines whether a first object is inside a second object, the object selection system 106 can test each detect instance of a woman in the image with each detected instance of dress to determine a pair that satisfies the object relationship model.

In one or more implementations, the object relationship model utilizes heuristics to determine whether a pair of detected objects satisfy the object relationship model. For example, the object relationship model is defined by a set of rules that indicate when a first detected object intersects with a second detected object. The rules for each object relationship model may vary based on the type of relationship being applied between the objects. Additional examples of utilizing different object relationship models are provided below in connection with FIG. 10

In alternative implementations, the object relationship model trains and/or utilizes a machine-learning model to determine an intersection of detected objects that satisfy the object relationship model. For example, the object selection system 106 utilizes supervisory training to teach an object relationship neural network to predict when a target intersection occurs between two objects based on the objects, the relationship type, and/or the image.

As shown, the series of acts 800 includes an act 816 of the object selection system 106 selecting the query object based on the output of the selected object relationship model. For example, the selected object relationship model outputs one or more pairwise sets of objects that satisfies the object relationship model. Based on this output, the object selection system 106 can select the query object. For example, the object selection system 106 selects the first object instance included in a pairwise set. To illustrate, for the query string "woman in the dress," the selected object relationship model outputs a pairwise set of objects where a woman intersects with a dress. From this output, the object selection system 106 can select the instance of the woman included in the pairwise set as the query object.

In one or more implementations, the object selection system 106 can generate an object mask for the selected query object. For example, the object selection system 106 utilizes the object mask neural network described above with respect to the object selection pipeline. In alternative implementations, the object selection system 106 can select the object mask for the selected query object if it was previously generated.

As shown, the series of acts 800 includes an act 818 of the object selection system 106 providing the selected query object within the image. For example, the object selection system 106 automatically selects the query object in the image in response to the query string (i.e., natural language object selection query), as previously described.

As mentioned above, FIGS. 9A-9B below provide a visual example of a component graph based on a query string as well as provide further detail with respect to generating a component graph. For context, FIG. 9A illustrates a graphical user interface of a digital image that includes a natural language object selection query in accordance with one or more implementations. As shown, FIG. 9A includes the client device 300 introduced above, which includes an image editing application and the object selection system 106 within a graphical user interface 902.

As shown, the graphical user interface 902 includes an image 904 of a man on a bike, a woman standing next to a bike, and background scenery. In addition, the graphical user interface 902 includes an object selection interface 906, as described above in connection with FIG. 3A, where the user provides the query string of "person on the bike."

Turning to FIG. 9B, a component graph is illustrated. In particular, FIG. 9B illustrates a component graph 910 generated based on the query string 912. As previously described, based on the component graph 910, the object selection system 106 can determine the structure of the query string, including which objects are involved in a relationship and what relationship is required. To illustrate, the component graph 910 is structured as a binary tree with leaf nodes that correspond to the words in the query string 912. In alternative implementations, the component graph 910 can be structured in alternative arrangements, as described above.

As shown, the component graph 910 includes multiple nodes types. For instance, the component graph 910 includes locate nodes (e.g., a first locate node 916a and a second locate node 916b) that correspond to objects detected in the query string 912. As described above, for each locate node, the object selection system 106 can utilize the object selection pipeline to detect all instances of the corresponding object. In addition, the component graph 910 includes a relationship node 918, which corresponds to a relationship between objects in the query string 912. As shown, the relationship node 918 has two children nodes and describes the predicate of the relationship (e.g. "on") and the second locate node 916b (e.g., "bike"). Additionally, as described above, the object selection system 106 can select an object relationship model based on the relationship node 918.

Additionally, the component graph 910 includes an intersection node 914. As shown, the intersection node 914 includes the two children nodes of the first locate node 916a and the relationship node 918. In various implementations, the intersection node 914 provides an indication of the object relationship from the relationship node 918. As described above, the object selection system 106 can utilize the selected object relationship model to disambiguate, find, and select the correct instance of the object associated with the first locate node 916a. For example, the object selection system 106 executes a set of heuristic rules corresponding to the object relationship model to find the instance of the object associated with the first locate node 916a, which the object selection system 106 selects as the query object.

As described previously, the object selection system 106 can generate the component graph. For example, in various implementations, the object selection system 106 generates the component graph utilizing a selection parsing model (e.g., a natural language decomposition model) to generate the component graph. For example, in one or more implementations, the object selection system 106 utilizes the techniques and approaches found in Cirik et al. "Using Syntax to Ground Referring Expressions in Natural Images," published 2018, which is incorporated herein by reference in their entirety. Additionally, or in the alternative, the object selection system 106 can utilize other methods for generating a structured decomposition of the query string for grounding the language input.

Figure 10:
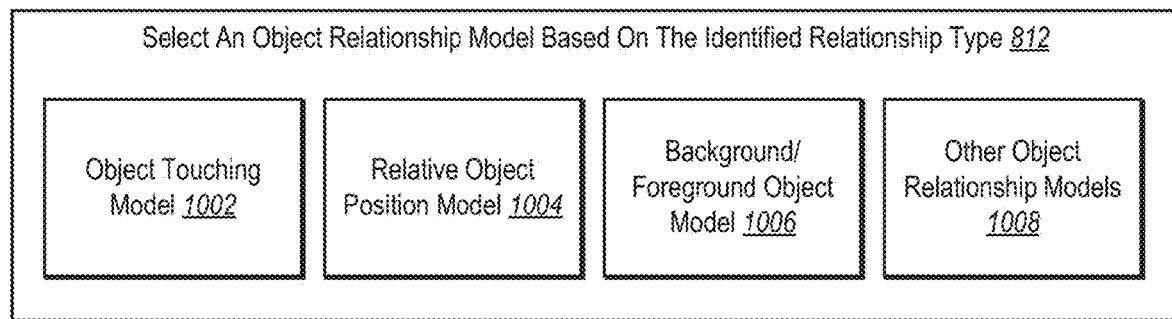
FIG. 10 illustrates a block diagram of multiple object relationship models in accordance with one or more implementations.

As mentioned above, FIG. 10 includes examples of utilizing different object relationship models. To illustrate, FIG. 10 shows a block diagram of multiple object relationship models in accordance with one or more implementations. In particular, FIG. 10 expands the act 812 of selecting an object relationship model based on the identified relationship type, as described above with respect to FIG. 8. Indeed, as shown in FIG. 10, the act 812 includes various object relationship models that the object selection system 106 can select, including an object touching model 1002, a relative object position model 1004, a background/foreground object model 1006, and other object relationship models 1008.

In one or more implementations, the object selection system 106 selects the object touching model 1002 as the selected object relationship model. For example, the object selection system 106 selects the object touching model 1002 when the relationship type (e.g., relationship node) in the component graph corresponds to objects being close to or touching each other in an image. For example, the object selection system 106 selects the object touching model 1002 when the relationship node includes an action, such as "holding," "wearing," "touching" or a preposition, such as "in," "with," "of."

In various implementations, the object selection system 106 implements a touching operator of TOUCHING(Object_1, Object_2) to check in a first object (e.g., Object_1) and a second object (e.g., Object_2) intersect or overlap within the image. In various implementations, to obtain increased accuracy, object touching model 1002 checks the object areas within the object masks of the first object and the second object for overlap. For example, in one or more implementations, the object touching model 1002 determines if the intersection between the two object masks is greater than zero. In alternative implementations, the touching threshold is a distance greater than zero, such as 1, 2, 5, 10, or more pixels.

In some implementations, when the intersection threshold is zero, two adjacent object masks may still fail to satisfy the object touching model 1002. For example, the object mask neural network utilized to generate the object masks is unable to produce an exact object mask, and this the edges of two adjacent object masks are a few pixels away from each other, which results in a non-intersecting scenario. In these implementations, the object selection system 106 and/or the object touching model 1002 can execute an image dilation for one or more iterations on one or more of the object masks to expand their area before checking for an intersection.

In some implementations, the object selection system 106 selects the relative object position model 1004 as the object relationship model. In many implementations, the relative object position model 1004 determines a relative position of a first object (i.e., object instance) with respect to a second object. Examples of relative position types include "left," "right," "on top," "above," "bottom," "under," "below," and "beneath." In various implementations, the object selection system 106 selects the relative object position model 1004 based on identifying a relationship type that corresponds to one of the relative positions indicated above.

In many implementations, the relative object position model 1004 includes a relative position table that maps a position to a canonical form. For example, for the position of "top," the relative position table can include the relative positions of "on," "above," "on top of" "on the top of," and "to the top of." Additionally, for the position of "right," the relative position table can include the relative positions of "on the right," "right of," and "to the right."

Figure 11:
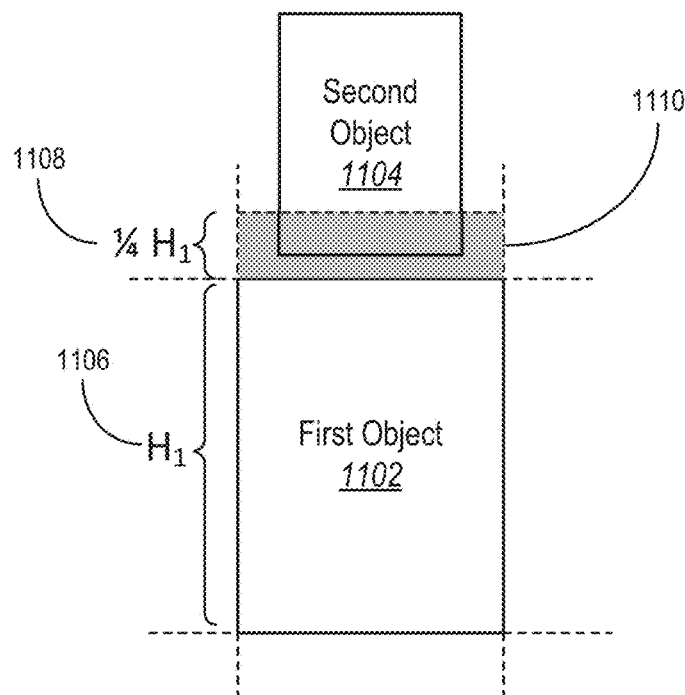
FIG. 11 illustrates a schematic diagram illustrating utilizing a relative object position model to select an object in accordance with one or more implementations.

In various implementations, the relative object position model 1004 implements a relative position operator of RELATIVE_POSITION(Bounding_Box_1, Bounding_Box_2, Relative_Position) to check if the first bounding box (e.g., Bounding_Box_1) is at the Relative_Position relative to the second bounding box (e.g., Bounding_Box_2), where Relative_Position is one of the canonical forms of top, bottom, left, or right. FIG. 11, described below, provides an example of determining if a first object satisfies a relative position to a second object.

In various implementations, the object selection system 106 selects the background/foreground object model 1006 as the selected object relationship model. For example, if the object selection system 106 detects a relationship type that corresponds to the background or foreground of an image or differing depths between objects, the object selection system 106 can select the background/foreground object model 1006. For example, the object selection system 106 detects the relationship type of "in the background" or "in front" from the component graph.

In various implementations, the background/foreground object model 1006 implements a foreground operator and/or a background operator. For example, in one or more implementations, the background/foreground object model 1006 implements an IN_BACKGROUND(Object_1) operation to determine in the first object (e.g., the object mask of the first object) is in the background of the image. In these implementations, the background/foreground object model 1006 can utilize a specialist model from the object selection pipeline to detect the foreground and/or background in the image. In particular, the background/foreground object model 1006 can receive a background mask from the specialist model and/or an object mask neural network.

Further, the background/foreground object model 1006 can compare the first image object mask with the background mask to determine if there is an intersection that satisfies the background/foreground object model 1006. For example, the background/foreground object model 1006 can determine if the majority of the first object is within the background. To illustrate, in one or more implementations, the background/foreground object model 1006 can apply the following heuristic, intersection(first object mask, background mask)/area(first object mask)≥0.5, to determine that most of the first object mask overlaps with the background mask.

Similarly, the background/foreground object model 1006 can implement an IN_FOREGROUND(Object_1) operation. Further, the background/foreground object model 1006 can utilize other operations, such as an IN_FRONT(Object_1, Object_2) operation or a BEHIND(Object_1, Object_2) operation, which utilizes a depth map to determine the relative depths of the first object and the second object.

In some implementations, the object selection system 106 selects one or more other object relationship models 1008 as the selected object relationship model. For example, the object selection system 106 selects an object relationship model that determines whether an object has a particular color (e.g., HAS_COLOR(Object_1, Color)). As another example, the object selection system 106 selects an object relationship model that compares the size between objects (e.g., IS_LARGER (Object_1, Object_2, . . . )). Further, the object selection system 106 can utilize object relationship model targeted toward other object attributes, such as size, length, shape, position, location, pattern, composition, expression, emotion, rigidity, and/or flexibility.

As mentioned above, FIG. 11 corresponds to determining if a first object satisfies a relative position to a second object (e.g., based on the relationship type of "on top of"). In particular, FIG. 11 illustrates utilizing the relative object position model 1004 to select an object in accordance with one or more implementations. For simplicity, FIG. 11 includes the bounding box of a first object 1102 and the bounding box of a second object 1104.

In addition, FIG. 11 also includes a first height 1106 corresponding to the height of the bounding box of a first object 1102 and a second height 1108 that is proportional to the first height 1106. As shown, the second height 1108 is one-fourth the height of the first height 1106. In alternative implementations, the second height 1108 is larger or smaller (e.g., one-half or one-eight height of the first height 1106). The size and shape of the relative position threshold area 1110 can vary based on the relationship type and/or the object relationship model being utilized. For example, the relationship type of above may extend from the top of the first object 1102 to the top edge of the image.

As also shown, the second height 1108 can be used to define a relative position threshold area 1110, which is based on the second height 1108 and the width of the bounding box of a first object 1102. If the bounding box of the second object 1104 has one or more pixels within the relative position threshold area 1110, the relative object position model 1004 can determine that the relative position is satisfied. In some implementations, at least a minimum amount of area of the bounding box of the second object 1104 (e.g., 15% or more) must be within the relative position threshold area 1110 before the relative object position model 1004 is satisfied.

In one or more implementations, the relative object position model 1004 can generate a separate relative position threshold area that corresponds to each canonical position. For example, for the canonical position of right, the relative object position model 1004 can generate a right relative position threshold area using the same or different proportions for the relative position threshold area 1110.

In alternative implementations, the relative object position model 1004 can utilize the same separate relative position threshold area and rotate the image before determining if the relative position is satisfied. For example, for the relative object position operator of RELATIVE_POSITION(Object_1, Object_2, Right), the relative object position model 1004 can rotate the image 90° clockwise and apply the relative position threshold area 1110 shown in FIG. 11. In this manner, the relative object position model 1004 simplifies the relative object position operator to check any relative position based on a single canonical position (e.g., top) and relative position threshold area 1110.

Figure 12A:
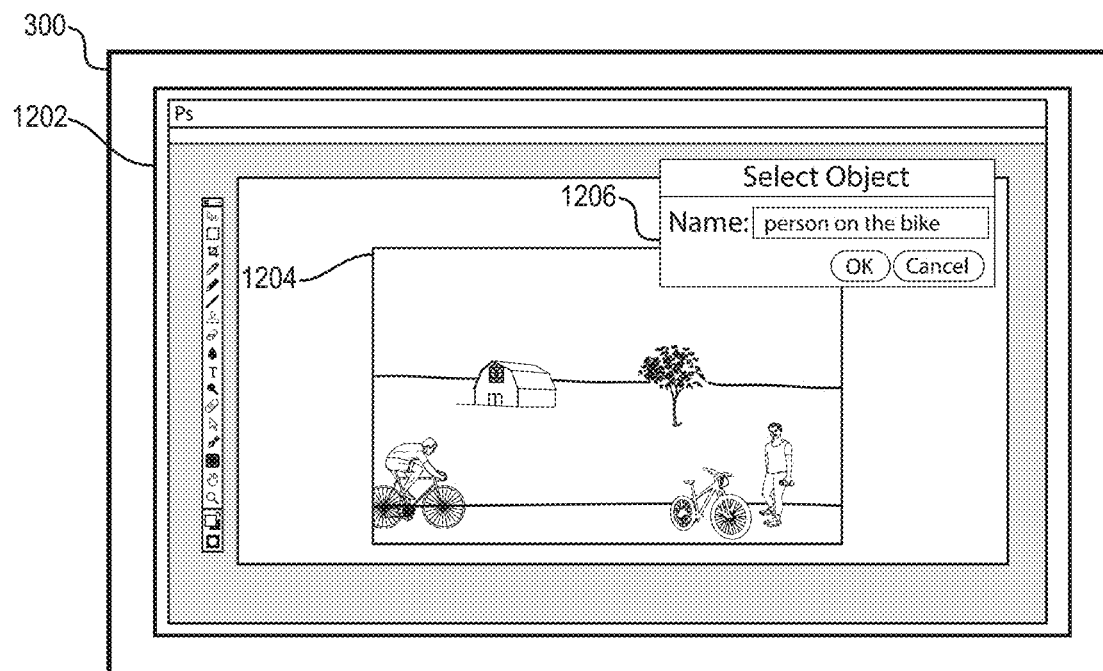
FIGS. 12A-12D illustrate a graphical user interface showing a process of utilizing an object relationship model to select a query object from among multiple objects associated with natural language user input in accordance with one or more implementations.

FIGS. 12A-12D illustrate a graphical user interface 1202 of utilizing an object relationship model to select a query object from among multiple objects associated with natural language user input in accordance with one or more implementations. For ease in explanation, FIGS. 12A-12D include the client device 300 introduced above. For example, the client device 300 includes an image editing application that implements the image editing system 104 and the object selection system 106. As shown in FIG. 12A, the graphical user interface 1202 includes an image 1204 of a man on a bike, a woman standing next to a bike, and background scenery. In addition, the graphical user interface 1202 includes an object selection interface 1206, as described above in connection with FIG. 3A, where the user provides the query string of "person on the bike."

To automatically select the query object in the query string, as described above, the object selection system 106 can generate a component graph to identify the objects in the query string as well as a relationship type. For example, the object selection system 106 generates a component graph for the query string, such as the component graph shown in FIG. 9B, which is previously described. Indeed, the component graph can identify the two object classes (e.g., "person" and "bike") as well as the relationship type of "on."

Figure 12B:
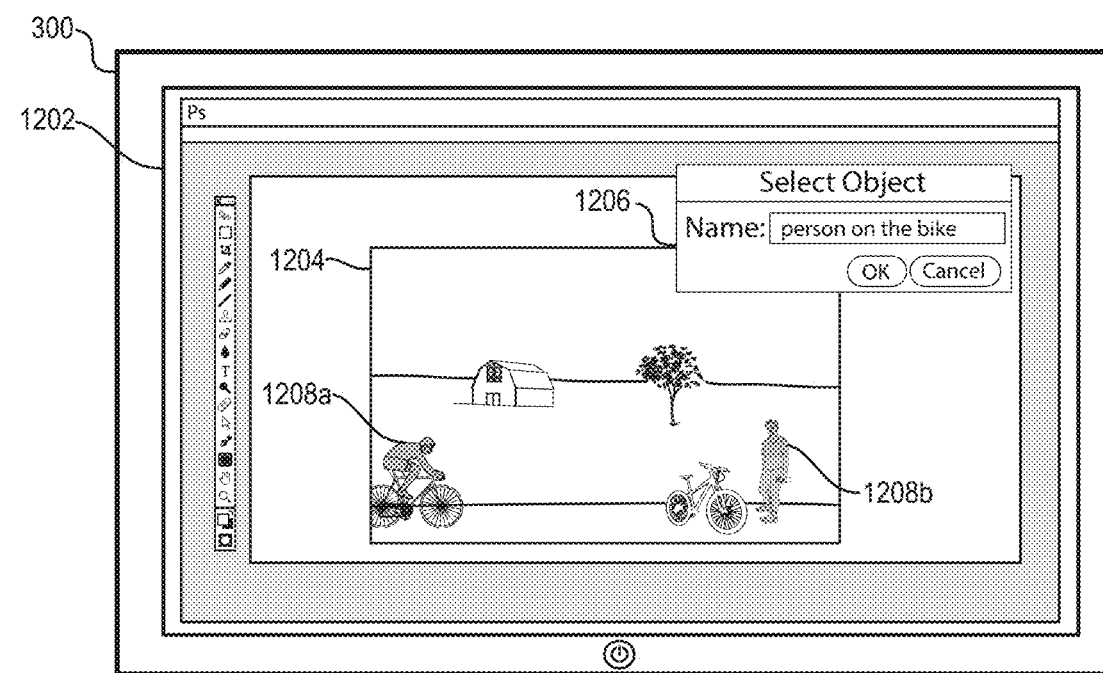

As described previously, the object selection system 106 can utilize the object selection pipeline to select an object detection model that best detects persons (e.g., a specialist object detection neural network), detect each instance of person in the image 1204 using the selected object detection model, and, in some cases, generate object masks for each of the detected instances. To illustrate, FIG. 12B shows the object selection system 106 detecting a first person instance 1208a and a second person instance 1208b.

Figure 12C:
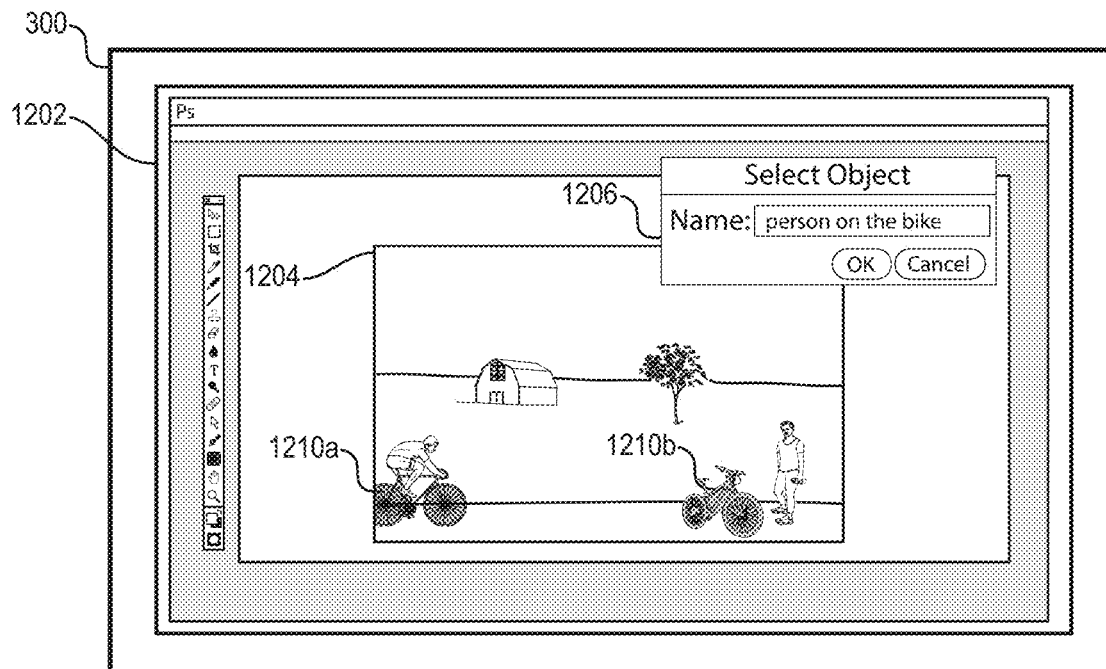

Additionally, the object selection system 106 can utilize the object selection pipeline to select an object detection model that best detects bikes (e.g., a known object class neural network), detect one or more instances of the bike in the image 1204 using the selected object detection model, and, in some instances, generates object masks for each of the detected bike instances. To illustrate, FIG. 12C shows the object selection system 106 detecting a first bike instance 1210a and a second bike instance 1210b.

In one or more implementations, the object selection system 106 does not initially identify an object detection neural network that corresponds to the object term of "bike" (e.g., the term bikes does not correspond to a known object class). As described above, the object selection system 106 can utilize a mapping table to identify a synonym, such as "bicycle," which the object selection system 106 recognizes as a known object class. Then, using the alternative object term of "bicycle," the object selection system 106 can utilize the known object class neural network to detect each instance of the bike.

As described above, the object selection system 106 can select an object relationship model based on the relationship type to determine an intersection between instances of persons and instances of bikes. For example, in one or more implementations, the object selection system 106 selects the object touch model, based on the relationship type of "on," to test intersections between the two sets of objects. In particular, the object touch model performs the following tests:

TOUCHING(first person instance 1208a, first bike instance 1210a),

TOUCHING(first person instance 1208a, second bike instance 1210b),

TOUCHING(second person instance 1208b, first bike instance 1210a), and

TOUCHING(second person instance 1208b, second bike instance 1210b).

Upon performing each of the above tests, the object selection system 106 can determine that the intersection between the first person instance 1208a and the first bike instance 1210a satisfies the object touch model, while the other tests fail to satisfy the object touch model. Accordingly, the object touch model can generate output that indicates that the first person instance 1208a is "on" a bike.

Figure 12D:
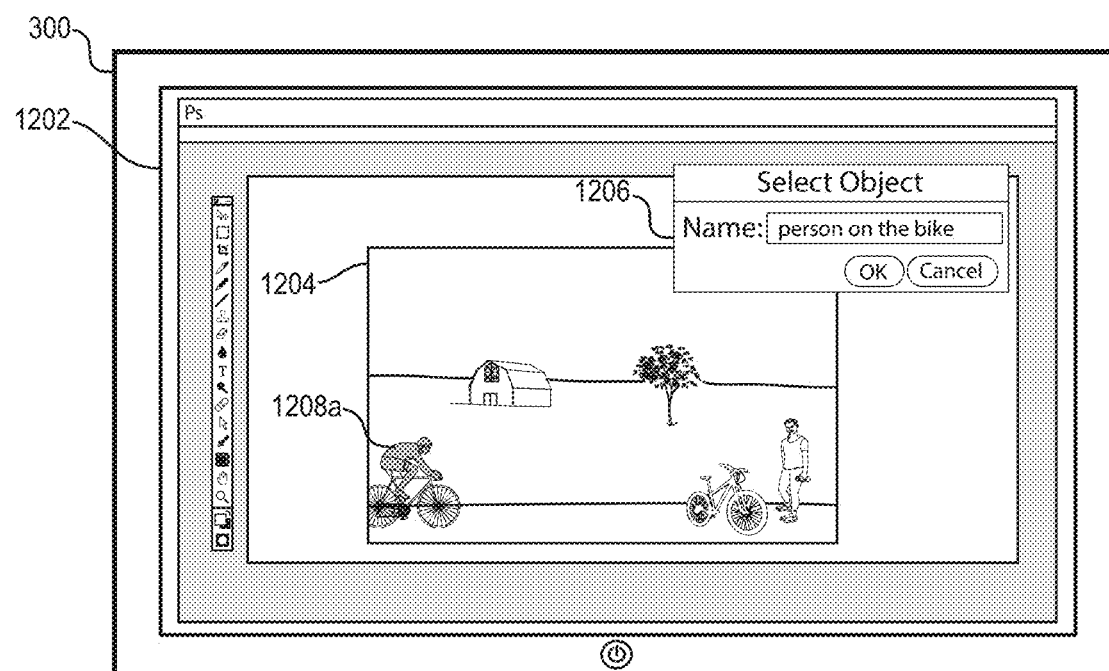

Based on the output of the object touch model (e.g., the selected object relationship model), the object selection system 106 can automatically select the first person instance 1208a. To illustrate, FIG. 12D shows the first person instance 1208a selected within the image 1204. Indeed, the object selection system 106 can automatically select the first person instance 1208a in the image 1204 in response to the query string.

As a note, in many implementations, the object selection system 106 does not display intermediary actions to the user. Rather, the object selection system 106 appears to automatically detect and accurately select the query object in response to the user's query string request. In other words, the graphical user interface 1202 jumps from FIG. 12A to FIG. 12D. In alternative implementations, the object selection system 106 displays one or more of the intermediary actions to the user. For example, the object selection system 106 displays the graphical user interfaces and each selected object instance (and/or boundary boxes of each detected object instance), as shown in FIGS. 12B and 12C.

Turning to FIG. 13, an evaluation table 1310 evaluating various implementations of the object selection system is illustrated in accordance with one or more implementations. By way of context, evaluators tested various implementations of the object selection system 106 to test if the object selection system 106 provided improvements over a baseline selection model.

For the evaluations, the evaluators utilized the quality measurement of Intersection over Union (IoU) of an output mask compared to a ground truth mask for a natural language object selection query (i.e., query string). In particular, the evaluators ran a test dataset of approximately 1000 images and 2000 query strings.

For the implementations of the object selection system 106 described herein, the evaluators found substantial improvements over baseline models. For example, as shown in the evaluation table 1310, the Mean IoU went from 0.3036 for the baseline selection model (e.g., the first row of the evaluation table 1310) to 0.4972 (e.g., the last row of the evaluation table 1310) based on the added improvements of the natural language processing tools described herein (e.g., utilizing a component graph and mapping table). Indeed, the evaluation table 1310 confirms that the object selection system 106 empirically improves the accuracy of object selection models.

Figure 14:
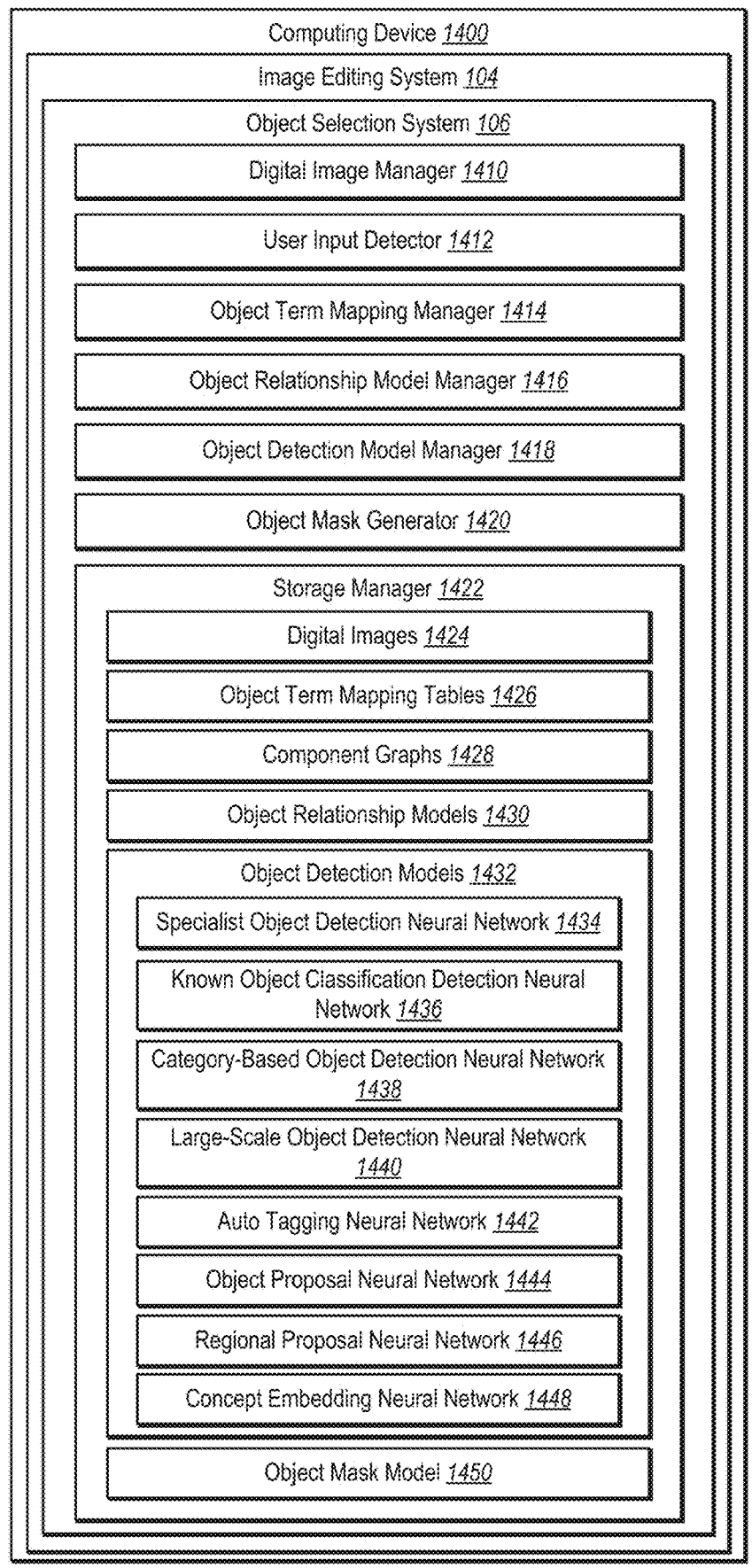
FIG. 14 illustrates a schematic diagram of the object selection system in accordance with one or more implementations.

Referring now to FIG. 14, additional detail is provided regarding capabilities and components of the object selection system 106 in accordance with one or more implementations. In particular, FIG. 14 shows a schematic diagram of an example architecture of the object selection system 106 implemented within the image editing system 104 and hosted on a computing device 1400. The image editing system 104 can correspond to the image editing system 104 described previously in connection with FIG. 1.

As shown, the object selection system 106 is located on a computing device 1400 within an image editing system 104. In general, the computing device 1400 may represent various types of client devices. For example, in some implementations, the client is a mobile device, such as a laptop, a tablet, a mobile telephone, a smartphone, etc. In other implementations, the computing device 1400 is a non-mobile device, such as a desktop or server, or another type of client device. Additional details with regard to the computing device 1400 are discussed below as well as with respect to FIG. 17.

As illustrated in FIG. 14, the object selection system 106 includes various components for performing the processes and features described herein. For example, the object selection system 106 includes a digital image manager 1410, a user input detector 1412, an object term mapping manager

1414, an object relationship model manager 1416, an object detection model manager 1418, an object mask generator 1420, and a storage manager 1422. As shown, the storage manager 1422 includes digital images 1424, object term mapping tables 1426, component graphs 1428, object relationship models 1430, object detection models 1432, an object mask model 1434. Each of the components mentioned above is described below in turn.

As mentioned above, the object selection system 106 includes the digital image manager 1410. In general, the digital image manager 1410 facilitates identifying, accessing, receiving, obtaining, generating, importing, exporting, copying, modifying, removing, and organizing images. In one or more implementations, the digital image manager 1410 operates in connection with an image editing system 104 (e.g., an image editing application) to access and edit images, as described previously. In some implementations, the digital image manager 1410 communicates with the storage manager 1422 to store and retrieve the digital images 1424, for example, within a digital image database managed by the storage manager 1422.

As shown, the object selection system 106 includes the user input detector 1412. In various implementations, the user input detector 1412 can detect, receive, and/or facilitate user input on the computing device 1400 in any suitable manner. In some instances, the user input detector 1412 detects one or more user interactions (e.g., a single interaction, or a combination of interactions) with respect to a user interface. For example, the user input detector 1412 detects a user interaction from a keyboard, mouse, touch page, touch screen, and/or any other input device in connection with the computing device 1400. For instance, the user input detector 1412 detects user input of a query string (i.e., a natural language object selection query) submitted from an object selection interface requesting automatic selection of an object within an image. In addition, the user input detector 1412 detects an additional user input from a mouse selection and/or a touch input to indicate an object location within the image, as described above.

As shown, the object selection system 106 includes the object term mapping manager 1414. In one or more implementations, the object term mapping manager 1414 creates, generates, accesses, modifies, updates, removes, and/or otherwise manages object term mapping tables 1426 (i.e., mapping table). For example, as detailed above, the object term mapping manager 1414 can generate, utilize, and update one or more object term mapping tables 1426 that maps object terms to synonym object terms, hypernym object terms, and/or hyponyms object terms (i.e., alternative object terms). In general, the object term mapping manager 1414 maps object terms for objects not corresponding to known object classes to one or more alternative object terms, as explained above.

In one or more implementations, the object selection system 106 can include a component graph manager. In various implementations, the component graph manager creates, generates, accesses, modifies, updates, removes, and/or otherwise manages component graphs 1428. In one or more implementations, the component graph manager generates a component graph. In alternative implementations, the component graphs 1428 are generated by an external party or source.

As shown, the object selection system 106 includes the object relationship model manager 1416. In various implementations, the object relationship model manager 1416 analyzes and uses component graphs 1428 to identify objects in corresponding query strings and relationship types between their objects, as described above. In addition, in some implementations, the object relationship model manager 1416 selects an object relationship model from the object relationship models 1430 based on the relationship type identified in the component graph. Further, the object relationship model manager 1416 can determine an intersection of objects identified in the query string/component graph that satisfies the selected object relationship model.

As shown, the object selection system 106 includes the object detection model manager 1418. In various implementations, the object detection model manager 1418 maintains, creates, generates, trains, updates, accesses, and/or utilizes the object detection neural networks disclosed herein. As described above, the object detection model manager 1418 detects one or more objects within an image (e.g., a query object) and generates a boundary (e.g., a boundary box) to indicate the detected object.

In addition, in a number of implementations, the object detection model manager 1418 can communicate with the storage manager 1422 to store, access, and utilize the object detection models 1432. In various implementations, the object detection models 1432 include one or more specialist object detection models 1434 (e.g., a sky detection neural network, face detection neural network, body/body parts detection neural network, skin detection neural network, clothes detect neural network, and waterfall detection neural network), known object class detection neural networks 1436 (e.g., detects objects having classes learned from training data), category-based object detection neural networks 1438 (e.g., detects uncountable objects such as the floor, water, and sand), and large-scale object detection neural networks 1440 (e.g., detects objects of unknown object classes), each of which are described above. In addition, the object detection model manager 1418 can include one or more neural networks in connection with the above object detection neural networks to detect objects within an image, such as auto tagging neural networks 1442, object proposal neural networks 1444, regional proposal neural networks 1446, and concept embedding neural networks 1448, each of which are described above. Indeed, the object detection model manager 1418 can utilize various object detection neural networks within the object selection pipeline to detect objects within a query string, as previously described.

In addition, as shown, the object selection system 106 includes the object mask generator 1420. In one or more implementations, the object mask generator 1420 produces, creates, and/or generates accurate object masks from detected objects. For example, the object detection model manager 1418 provides a boundary of an object (e.g., a detected query object) to the object mask generator 1420, which utilizes the one or more object mask models 1432 to generate an object mask of the detected object, as described above. As also explained above, in various implementations, the object mask generator 1420 generates multiple object masks when multiple instances of the query object are detected.

Each of the components 1410-1450 of the object selection system 106 can include software, hardware, or both. For example, the components 1410-1450 can include one or more instructions stored on a computer-readable storage medium and executable by processors of one or more computing devices, such as a client device (e.g., a mobile client device) or server device. When executed by the one or more processors, the computer-executable instructions of the object selection system 106 can cause a computing device to perform the feature learning methods described herein. Alternatively, the components 1410-1450 can include hardware, such as a special-purpose processing device to perform a certain function or group of functions. In addition, the components 1410-1450 of the object selection system 106 can include a combination of computer-executable instructions and hardware.

Furthermore, the components 1410-1450 of the object selection system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1410-1450 may be implemented as a stand-alone application, such as a desktop or mobile application. Additionally, the components 1410-1450 may be implemented as one or more web-based applications hosted on a remote server. The components 1410-1450 may also be implemented in a suite of mobile device applications or "apps." To illustrate, the components 1410-1450 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Inc. in the United States and/or other countries.

FIGS. 1-14, the corresponding text, and the examples provide a number of different methods, systems, devices, and non-transitory computer-readable media of the object selection system 106. Additionally, the acts described herein may be repeated or performed in parallel with one another or parallel with different instances of the same or similar acts.

Figure 15:
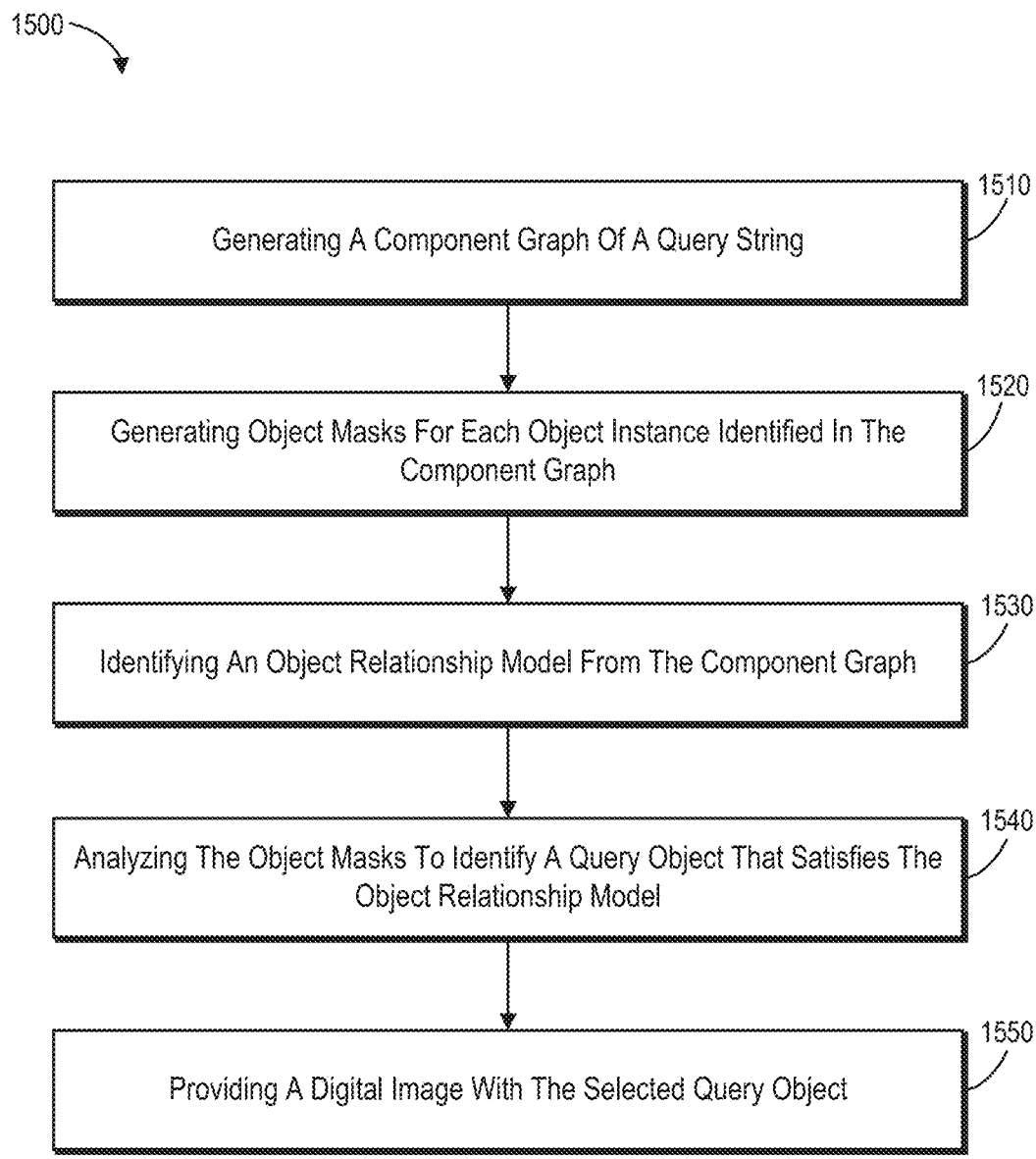
FIG. 15 illustrates a flowchart of a series of acts for utilizing object relationship models to detect a query object in accordance with one or more implementations.
Figure 16:
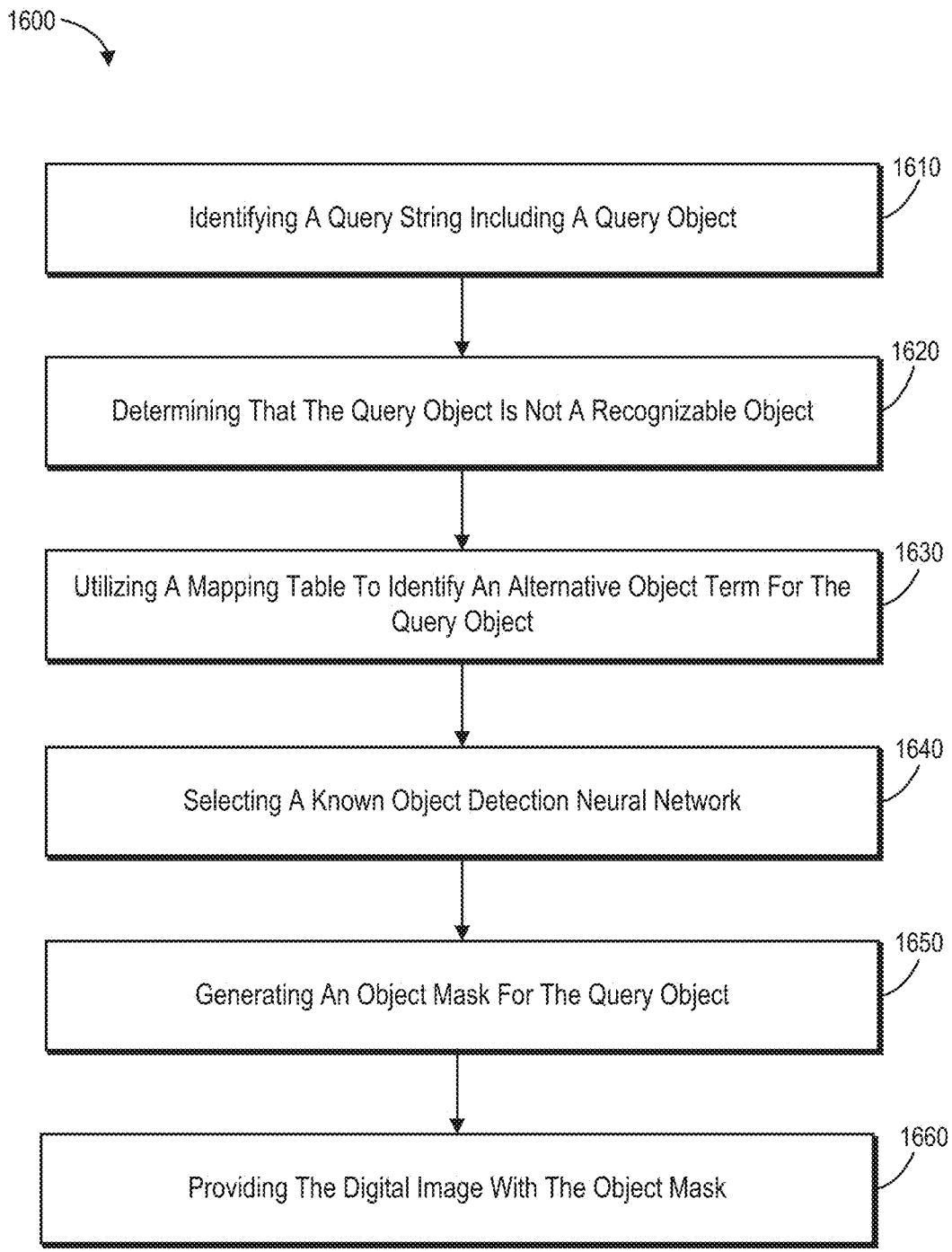
FIG. 16 illustrates a flowchart of a series of acts for utilizing alternative object terms and multiple object detection models to detect a query object in accordance with one or more implementations.

As mentioned, FIG. 15 and FIG. 16 each illustrates a flowchart of a series of acts in accordance with one or more implementations. While FIG. 15 and FIG. 16 each illustrates acts according to one implementation, alternative implementations may omit, add to, reorder, and/or modify any of the acts shown. The acts of FIG. 15 and FIG. 16 can be performed as part of a method. Alternatively, a non-transitory computer-readable medium can comprise instructions that, when executed by one or more processors, cause a computing device to perform the acts of FIG. 15 and FIG. 16. In some implementations, a system can perform the acts of FIG. 15 and FIG. 16.

To illustrate, FIG. 15 shows a flowchart of a series of acts 1500 for utilizing object relationship models to detect a query object in accordance with one or more implementations. In various implementations, the series of acts 1500 is implemented on one or more computing devices, such as the client device 102, the server device 110, the client device 300, or the computing device 1400. In addition, in some implementations, the series of acts 1500 is implemented in a digital environment for creating or editing digital content (e.g., digital images). For example, the series of acts 1500 is implemented on a computing device having memory that includes a digital image, a component graph of a query string indicating a first object to be selected based on a second object within a digital image, one or more object detection neural networks.

The series of acts 1500 includes an act 1510 of generating a component graph of a query string. In particular, the act 1510 can involve generating a component graph of a query string to identify a plurality of object classes and a relationship type between the plurality of object classes. In one or more implementations, the act 1510 includes analyzing the component graph of the query string to identify a relationship type identifier between the first object and the second object. In various implementations, the act 1520 includes utilizing a natural language decomposition model that generates the component graph from the query string.

As shown, the series of acts 1500 also includes an act 1520 of generating object masks for each object instance identified in the component graph. In particular, the act 1520 can involve generating one or more object masks for each of the plurality of object classes utilizing one or more object detection models. In one or more implementations, the act 1520 includes generating one or more object mask instances for each of the first object and the second object by utilizing the one or more object detection neural networks. In some implementations, the plurality of object classes includes a specialized object, a known object, an object category, a concept object, or an unknown object.

As shown in FIG. 15, the series of acts 1500 further includes an act 1530 of identifying an object relationship model from the component graph. In particular, the act 1530 can include identifying an object relationship model from a plurality of object relationship models based on the relationship type. In one or more implementations, the act 1530 includes identifying an object relationship model based on the relationship type by matching the relationship type to an object relationship model. In various implementations, the plurality of object relationship models includes an object touching model, a relative object position model, and a background/foreground object model.

As shown, the series of acts 1500 also includes an act 1540 of analyzing the object masks to identify a query object that satisfies the object relationship model. In particular, the act 1540 can include analyzing the one or more object masks generated for each of the plurality of object classes to identify a query object that satisfies the object relationship model. In one or more implementations, the act 1540 includes determining a query object by identifying an intersection between the one or more object mask instances for the first object and one or more object mask instances for the second object that satisfies the object relationship model.

In some implementations, the act 1540 includes determining the query object based on the object relationship model by utilizing heuristic rules to determine the query object. In alternative implementations, the act 1540 includes determining the query object based on the object relationship model by utilizing machine-learning to determine the query object. In various implementations, the act 1540 can include identifying a query object that satisfies the object relationship model by identifying an intersection between one or more object mask instances for the first object and one or more object mask instances for the second object that satisfies the object relationship model.

As shown, the series of acts 1500 also includes an act 1550 of providing a digital image with the selected query object. In particular, the act 1550 can involve providing a digital image with the query object selected in response to receiving the query string. In one or more implementations, the act 1550 includes providing the digital image with the object mask in response to receiving the query string.

The series of acts 1500 can also include a number of additional acts. In additional implementations, the series of acts 1500 includes an act of utilizing a mapping table to identify an object class of the plurality of object classes based on determining one or more alternative object terms for the object class. In one or more implementations, the series of acts 1500 includes additional acts of identifying an object attribute associated with an object of the one or more object classes and detecting a target instance of the object based on the object attribute and the one or more object detection models.

As mentioned above, FIG. 16 illustrates a flowchart of a series of acts 1600 for utilizing object relationship models to detect a query object in accordance with one or more implementations. In various implementations, the series of acts 1600 is implemented on one or more computing devices, such as the client device 102, the server device 110, the client device 300, or the computing device 1400.

The series of acts 1600 includes an act 1610 of identifying a query string including a query object. In particular, the act 1610 can involve analyzing a query string that indicates a query object to be selected in a digital image. In some implementations, the act 1610 also includes analyzing the query string to identify a noun indicating the query object. In various implementations, the act 1610 further includes analyzing the noun to determine an object class type of the query object. In example implementations, the act 1610 includes receiving text input from the user associated with a client device and identifying the text input as the query string (i.e., a natural language object selection query).

As shown, the series of acts 1600 also includes an act 1620 of determining that the query object is not a recognizable object. In particular, the act 1620 can involve determining that the query object does not correspond to a known object class. In one or more implementations, the act 1620 includes not identifying the query object in a listing or database of known object classes.

As shown in FIG. 16, the series of acts 1600 further includes an act 1630 of utilizing a mapping table to identify an alternative object term for the query object. In particular, the act 1630 can include, utilizing a mapping table to identify one or more alternative object terms for the query object based on the query object not corresponding to a known object class. In one or more implementations, the one or more alternative object terms include a synonym of the query object that corresponds to a known object class. In some implementations, the act 1630 includes updating the mapping table to modify the one or more alternative object terms of the query object.

As shown, the series of acts 1600 also includes an act 1640 of selecting a known object detection neural network. In particular, the act 1640 can include determining, based on at least one of the one or more alternative object terms of the query object, to select a known object detection neural network. In one or more implementations, the known object detection neural network includes a specialist object detection neural network that corresponds to the one or more alternative object terms of the query object. In alternative implementations, the known object detection neural network includes an object class detection neural network that corresponds to the one or more alternative object terms of the query object.

In various implementations, the one or more alternative object terms include a hypernym of the query object that corresponds to a known object class. In additional implementations, the act 1640 can include utilizing a tagging model to identify the query object from a plurality of instances of the query object that corresponds to the hypernym of the query object. For example, in one or more implementations, the act 1640 can also include utilizing the tagging model to tag the plurality of instances of the query object that corresponds to a hypernym of the query object, utilizing the mapping table to identify one or more additional alternative object terms for a tagged instance of the query object from the plurality of instances of the query object, and filtering out the tagged instance of the query object based on the one or more additional alternative object terms not corresponding to the query object.

As shown, the series of acts 1600 also includes an act 1650 of generating an object mask for the query object. In particular, the act 1650 can involve generating an object mask for the query object utilizing the known object detection neural network. In various implementations, the object mask neural network utilizes a boundary (e.g., boundary box) to identify the detected query object as well as generate an accurate object mask for the detected query object.

As shown, the series of acts 1600 also includes an act 1660 of providing the digital image with the object mask. In particular, the act 1660 can involve providing the digital image with the object mask for the query object in response to receiving the query string. In particular, the act 1660 can involve providing the image with an object mask of the query object to a client device associated with a user. In some implementations, the act 1660 includes automatically selecting the detected query object within an image editing application by utilizing the object mask of the query object.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object selection system to create, execute, and/or modify the object selection pipeline as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be utilized in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is utilized.

Figure 17:
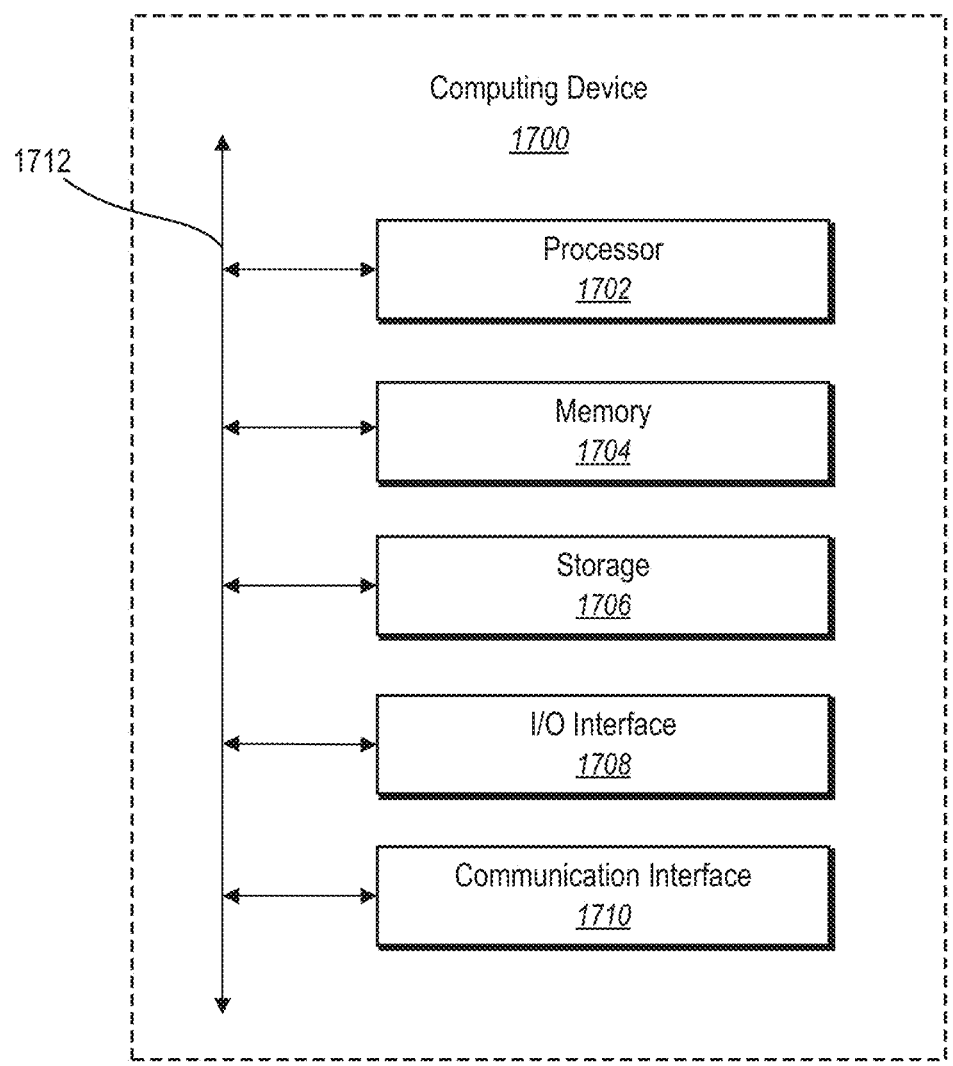
FIG. 17 illustrates a block diagram of an example computing device for implementing one or more implementations of the present disclosure.

FIG. 17 illustrates a block diagram of a computing device 1700 that may be configured to perform one or more of the processes described above. One will appreciate that one or more computing devices, such as the computing device 1700 may represent the computing devices described above (e.g., client device 102, the server device 110, the client device 300, or the computing device 1400). In one or more implementations, the computing device 1700 may be a mobile device (e.g., a laptop, a tablet, a smartphone, a mobile telephone, a camera, a tracker, a watch, a wearable device, etc.). In some implementations, the computing device 1700 may be a non-mobile device (e.g., a desktop computer, a server device, a web server, a file server, a social networking system, a program server, an application store, or a content provider). Further, the computing device 1700 may be a server device that includes cloud-based processing and storage capabilities.

As shown in FIG. 17, the computing device 1700 can include one or more processor(s) 1702, memory 1704, a storage device 1706, I/O interfaces 1708 (i.e., input/output interfaces), and a communication interface 1710, which may be communicatively coupled by way of a communication infrastructure (e.g., bus 1712). While the computing device 1700 is shown in FIG. 17, the components illustrated in FIG. 17 are not intended to be limiting. Additional or alternative components may be used in other implementations. Furthermore, in certain implementations, the computing device 1700 includes fewer components than those shown in FIG. 17. Components of the computing device 1700 shown in FIG. 17 will now be described in additional detail.

In particular implementations, the processor(s) 1702 includes hardware for executing instructions, such as those making up a computer program. As an example, and not by way of limitation, to execute instructions, the processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, the storage device 1706 can include a non-transitory storage medium described above. The storage device 1706 may include a hard disk drive (HDD), flash memory, a Universal Serial Bus (USB) drive or a combination these or other storage devices.

As shown, the computing device 1700 includes one or more I/O interfaces 1708, which are provided to allow a user to provide input to (e.g., user strokes), receive output from, and otherwise transfer data to and from the computing device 1700. These I/O interfaces 1708 may include a mouse, keypad or a keyboard, a touch screen, camera, optical scanner, network interface, modem, other known I/O devices or a combination of these I/O interfaces 1708. The touch screen may be activated with a stylus or a finger.

The I/O interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1708 are configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 provides one or more interfaces for communication (such as, for example, packet-based communication) between the computing device and one or more other computing devices or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can include hardware, software, or both that connects components of computing device 1700 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   analyze a query string to identify a plurality of object terms and at least one relationship term linking the plurality of object terms;
   generate a component graph of the query string to identify a plurality of object classes corresponding to the plurality of object terms and a relationship type between the plurality of object classes based on the at least one relationship term;
   generate one or more object masks for each of the plurality of object classes utilizing one or more object detection models;
   identify an object relationship model from a plurality of object relationship models based on the relationship type;
   analyze the one or more object masks generated for each of the plurality of object classes to identify a query object that satisfies the object relationship model; and
   provide a digital image with the query object selected in response to receiving the query string.

2. The non-transitory computer-readable medium of claim 1, wherein the plurality of object classes comprises a specialized object, a known object, an object category, a concept object, or an unknown object.

3. The non-transitory computer-readable medium of claim 1, further comprising instructions that, when executed by the at least one processor, cause the computing device to determine the query object based on the object relationship model by utilizing heuristic rules to determine the query object.

4. The non-transitory computer-readable medium of claim 1, further comprising instructions that, when executed by the at least one processor, cause the computing device to determine the query object based on the object relationship model by utilizing machine-learning to determine the query object.

5. The non-transitory computer-readable medium of claim 1, wherein the plurality of object relationship models comprise an object touching model, a relative object position model, and a background/foreground object model.

6. The non-transitory computer-readable medium of claim 1, further comprising instructions that, when executed by the at least one processor, cause the computing device to identify a query object that satisfies the object relationship model by identifying an intersection between one or more object mask instances for a first object and one or more object mask instances for a second object that satisfies the object relationship model.

7. The non-transitory computer-readable medium of claim 1, further comprising instructions that, when executed by the at least one processor, cause the computing device to utilize a natural language decomposition model that generates the component graph from the query string.

8. The non-transitory computer-readable medium of claim 1, further comprising instructions that, when executed by the at least one processor, cause the computing device to utilize a mapping table to identify an object class of the plurality of object classes based on determining one or more alternative object terms for the object class.

9. The non-transitory computer-readable medium of claim 8, wherein an alternative object term of the one or more alternative object terms comprises a synonym of the object class.

10. In a digital medium environment for creating or editing digital images, a computer-implemented method of selecting query objects, comprising:

analyzing a query string to identify an object term that indicates a query object to be selected in a digital image;

determining that the object term does not correspond to a known object class;

based on the object term not corresponding to a known object class, utilizing a mapping table to identify one or more alternative object terms for the query object;

determining, based on at least one of the one or more alternative object terms of the query object, to select a known object detection neural network;

generating an object mask for the query object utilizing the known object detection neural network; and providing the digital image with the object mask for the query object in response to receiving the query string.

11. The computer-implemented method of claim 10, wherein:

the object term comprises a noun; and the one or more alternative object terms comprise a synonym of the object term that corresponds to a known object class.

12. The computer-implemented method of claim 10, wherein the known object detection neural network comprises a specialist object detection neural network that corresponds to the one or more alternative object terms of the query object.

13. The computer-implemented method of claim 10, wherein the known object detection neural network comprises an object class detection neural network that corresponds to the one or more alternative object terms of the query object.

14. The computer-implemented method of claim 10, wherein:

the one or more alternative object terms comprise a hypernym of the object term that corresponds to a known object class; and the computer-implemented method further comprises utilizing a tagging model to identify the query object from a plurality of instances of the query object that corresponds to the hypernym of the object term.

15. The computer-implemented method of claim 14, further comprising:

utilizing the tagging model to tag the plurality of instances of the query object that corresponds to a hypernym of the object term;

utilizing the mapping table to identify one or more additional alternative object terms for a tagged instance of the query object from the plurality of instances of the query object; and filtering out the tagged instance of the query object based on the one or more additional alternative object terms not corresponding to the query object.

16. The computer-implemented method of claim 10, further comprising updating the mapping table to modify the one or more alternative object terms of the query object.

17. A system comprising:

one or more memory devices comprising:

a component graph of a query string comprising a first object term indicating a first object and a second object term indicating a second object, the first object to be selected based on the second object within a digital image and one or more object detection neural networks; and one or more server devices configured to cause the system to:

analyze the component graph of the query string to identify a relationship type identifier between the first object term and the second object term;

generate one or more object mask instances for each of the first object and the second object by utilizing the one or more object detection neural networks;

identify an object relationship model based on the relationship type identifier by matching the relationship type identifier to an object relationship model;

determine a query object by identifying an intersection between the one or more object mask instances for the first object and one or more object mask instances for the second object that satisfies the object relationship model; and provide the digital image with the query object indicated in response to receiving the query string.

18. The system of claim 17, wherein the one or more server devices are further configured to cause the system to utilize a mapping table to identify one or more alternative object terms for the first object term.

19. The system of claim 17, wherein the object relationship model comprise one of an object touching model, a relative object position models, or a background/foreground object model.

20. The system of claim 17, wherein the one or more object detection neural networks comprise at least one of a specialist object detection neural network, a concept-based object detection neural network, a known object class detection neural network, or an unknown object class detection neural network.

\* \* \* \* \*